(12) United States Patent
Jiang

(10) Patent No.: US 12,437,493 B2
(45) Date of Patent: Oct. 7, 2025

(54) METHOD AND APPARATUS FOR GENERATING EXPRESSION MODEL, DEVICE, AND MEDIUM

(71) Applicant: Tencent Technology (Shenzhen) Company Limited, Shenzhen (CN)

(72) Inventor: Xinwei Jiang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 205 days.

(21) Appl. No.: 18/370,344

(22) Filed: Sep. 19, 2023

(65) Prior Publication Data

US 2024/0013500 A1    Jan. 11, 2024

Related U.S. Application Data

(63) Continuation of application No. PCT/CN2022/137859, filed on Dec. 9, 2022.

(30) Foreign Application Priority Data

Mar. 11, 2022    (CN) .......................... 202210237344.9

(51) Int. Cl.
*G06T 17/00* (2006.01)
*G06T 17/20* (2006.01)
*G06T 19/20* (2011.01)

(52) U.S. Cl.
CPC .............. *G06T 19/20* (2013.01); *G06T 17/20* (2013.01); *G06T 2219/2016* (2013.01); *G06T 2219/2021* (2013.01)

(58) Field of Classification Search
CPC . G06T 19/20; G06T 17/20; G06T 2219/2016; G06T 2219/2021
See application file for complete search history.

(56) References Cited

U.S. PATENT DOCUMENTS 11,443,738 B2 *    9/2022    Choi ..................... G06V 40/174
11,461,870 B2 *    10/2022    Xu ......................... G06V 40/171
(Continued)

FOREIGN PATENT DOCUMENTS

CN    110531860 A    12/2019
CN    111325846 A    6/2020
(Continued)

OTHER PUBLICATIONS

Tencent Technology, Extended European Search Report, EP Patent Application No. 22930645.1, Mar. 3, 2025, 7 pgs.
(Continued)

*Primary Examiner* — Martin Mushambo
(74) *Attorney, Agent, or Firm* — Morgan, Lewis & Bockius LLP

(57) ABSTRACT

This application relates to t a method for generating an expression model, a device, and a medium. The method includes: obtaining a reference expression model of a target object, where the reference expression model is a facial model corresponding to a first expression; performing model transformation on a sample expression model set of a sample object by using the reference expression model of the target object as a reference, to obtain a target expression model set of an approximate object of the target object, and a similarity between the approximate object and the target object being greater than a similarity threshold; and performing mesh deformation on the reference expression model of the target object according to a mesh deformation difference between a first expression model and a second expression model in the target expression model set, to generate a deformed expression model of the target object.

20 Claims, 11 Drawing Sheets

(56) References Cited

U.S. PATENT DOCUMENTS

| | | | | |
|---|---|---|---|---|
| 11,521,368 | B2* | 12/2022 | Liu | G06V 20/46 |
| 2007/0127844 | A1* | 6/2007 | Watanabe | G06V 40/171 |
| | | | | 382/276 |
| 2012/0139899 | A1* | 6/2012 | Winchester | G06T 17/20 |
| | | | | 345/419 |
| 2014/0035934 | A1* | 2/2014 | Du | G06T 17/20 |
| | | | | 345/474 |
| 2020/0380682 | A1* | 12/2020 | Gao | G06V 10/754 |
| 2021/0027513 | A1* | 1/2021 | Choi | G06V 40/172 |
| 2021/0182537 | A1* | 6/2021 | Cao | G06V 10/82 |
| 2021/0232806 | A1* | 7/2021 | He | G06V 40/171 |
| 2021/0350508 | A1 | 11/2021 | Li et al. | |
| 2022/0012930 | A1* | 1/2022 | Wang | G06T 13/40 |
| 2022/0375150 | A1* | 11/2022 | Guo | G06V 40/174 |
| 2023/0247178 | A1* | 8/2023 | Yin | G06F 3/04845 |
| | | | | 348/14.08 |

FOREIGN PATENT DOCUMENTS

| | | |
|---|---|---|
| CN | 111583372 A | 8/2020 |
| CN | 112541477 A | 3/2021 |
| CN | 112967212 A | 6/2021 |
| CN | 113223126 A | 8/2021 |
| CN | 113762147 A | 12/2021 |
| CN | 113870401 A | 12/2021 |
| WO | WO 2021073417 A1 | 4/2021 |
| WO | WO 2022033206 A1 | 2/2022 |

OTHER PUBLICATIONS

Chen Cao et al., "FaceWarehouse: A 3D Facial Expression Database for Visual Computing", IEEE Transactions on Visualization and Computer Graphics, vol. 20, No. 3, Mar. 2014, 13 pgs.

Hao Li et al., "Example-Based Facial Rigging", ACM Journals, ACM Transactions on Graphics, vol. 29, No. 4, Jul. 2010, 6 pgs.

Tencent Technology (Shenzhen) Company Limited, ISR, PCT/CN2022/137859, Mar. 1, 2023, 3 pgs.

* cited by examiner

METHOD AND APPARATUS FOR GENERATING EXPRESSION MODEL, DEVICE, AND MEDIUM

CROSS-REFERENCE TO RELATED APPLICATIONS

This application is a continuation application of PCT Patent Application No. PCT/CN2022/137859, entitled "METHOD AND APPARATUS FOR GENERATING EXPRESSION MODEL, DEVICE, AND MEDIUM" filed on Dec. 9, 2022, which claims priority to Chinese Patent Application No. 202210237344.9, entitled "METHOD AND APPARATUS FOR GENERATING EXPRESSION MODEL, DEVICE, AND MEDIUM" filed on Mar. 11, 2022, all of which is incorporated herein by reference in its entirety.

FIELD OF THE TECHNOLOGY

This application relates to the field of modeling, and in particular, to a method and an apparatus for generating an expression model, a device, and a medium.

BACKGROUND OF THE DISCLOSURE

By using a Blend Shape (morph target) technology, a single mesh can be deformed to achieve a number of predefined shapes, as well as combine any number of meshes to obtained a combined shape. For a facial model, by using the Blend Shape technology, a plurality of meshes in the facial model may be deformed to obtain facial models showing different expressions.

In a related technology, after a first expression model of a target object is obtained, a sample expression model corresponding to a first expression and a sample expression model corresponding to a second expression are selected from a sample expression model set. According to a mesh deformation difference between the two sample expression models, mesh deformation is performed on the first expression model of the target object to obtain a second expression model of the target object.

However, when a similarity between the target object and a sample object in the sample expression model set is small, an expression effect of the generated second expression model of the target object is poor.

SUMMARY

The embodiments of this application provided a method and an apparatus for generating an expression model, a device, and a medium. The method improves an expression effect of a generated expression model of a target object. The technical solutions are as follows:

According to one aspect of this application, a method for generating an expression model is provided, including:
  obtaining a reference expression model of a target object;
  performing model transformation on a sample expression model set by using the reference expression model of the target object as a reference, to obtain a target expression model set, the sample expression model set including n sample expression models of a sample object, the target expression model set including n expression models of a approximate object, and the approximate object being obtained by performing facial reconstruction on the sample object by using the target object as a reference; and
  performing mesh deformation on the reference expression model of the target object according to a mesh deformation difference between a first expression model and a second expression model in the target expression model set, to generate a deformed expression model of the target object,
  the first expression model and the reference expression model being facial models corresponding to a first expression, the second expression model and the deformed expression model being facial models corresponding to a second expression, the second expression being different from the first expression, and n being an integer greater than 1.

According to another aspect of this application, an apparatus for generating an expression model is provided, including:
  an obtaining module, configured to obtain a reference expression model of a target object, the reference expression model being a facial model corresponding to a first expression; and
  a model generation module, configured to perform model transformation on a sample expression model set by using the reference expression model of the target object as a reference, to obtain a target expression model set, the sample expression model set including n sample expression models of a sample object, the target expression model set including n expression models of a approximate object, and the approximate object being obtained by performing facial reconstruction on the sample object by using the target object as a reference.

The model generation module is further configured to perform mesh deformation on the reference expression model of the target object according to a mesh deformation difference between a first expression model and a second expression model in the target expression model set, to generate a deformed expression model of the target object, the first expression model and the reference expression model being facial models corresponding to a first expression, the second expression model and the deformed expression model being facial models corresponding to a second expression, the second expression being different from the first expression, and n being an integer greater than 1.

According to another aspect of this application, a computer device is provided, including a processor and a memory, the memory storing at least one instruction, at least one program, a code set, or an instruction set, the at least one instruction, the at least one program, the code set, or the instruction set being loaded and executed by the processor to implement the method for generating an expression model described in the foregoing aspect.

According to another aspect of this application, a computer storage medium is provided, storing at least one computer program, the at least one computer program being loaded and executed by a processor to implement the method for generating an expression model described in the foregoing aspect.

According to another aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, to cause the computer device to perform the method for generating an expression model described in the foregoing aspect.

The technical solutions provided in the embodiments of this application produce at least the following beneficial effects:

After the reference expression model of the target object is obtained, the target expression model set is first generated, where the target expression model set includes expression models of the approximate object. The deformed expression model of the target object is then generated according to the mesh deformation difference between the first expression model and the second expression model in the target model set. Due to the high similarity between the approximate object and the target object, the mesh deformation difference of the expression model of the approximate object can be transferred to the expression model of the target object, so that the expression effect of the deformed expression model of the target object is good and closer to the actual situation.

DESCRIPTION OF EMBODIMENTS

To make objectives, technical solutions, and advantages of this application clearer, the following further describes implementations of this application in detail with reference to the accompanying drawings.

Computer vision (CV) is a science that studies how to use a machine to "see", and furthermore, is machine vision that a camera and a computer are used for replacing human eyes to perform recognition, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biometric feature recognition technologies such as common face recognition and fingerprint recognition. In the embodiments of this application, the CV technology is used to construct a three-dimensional object expression model.

Deformation transfer refers to imparting location motion changes of vertexes of one polygon mesh to vertexes of another polygon mesh.

Polygon mesh refers to a set of vertexes and polygons that represent polyhedral shapes in three-dimensional computer graphics, and is formed by triangles, quadrilaterals, or other simple convex polygons.

Information (including but not limited to user equipment information, user personal information, and the like), data (including but not limited to data used for analysis, stored data, displayed data, and the like), and signals involved in this application are all authorized by the user or full authorized by all parties, and acquisition, use, and processing of relevant data need to comply with relevant laws, regulations and standards of relevant countries and regions. For example, expression models and user information involved in this application are all obtained with full authorization.

Figure 1:
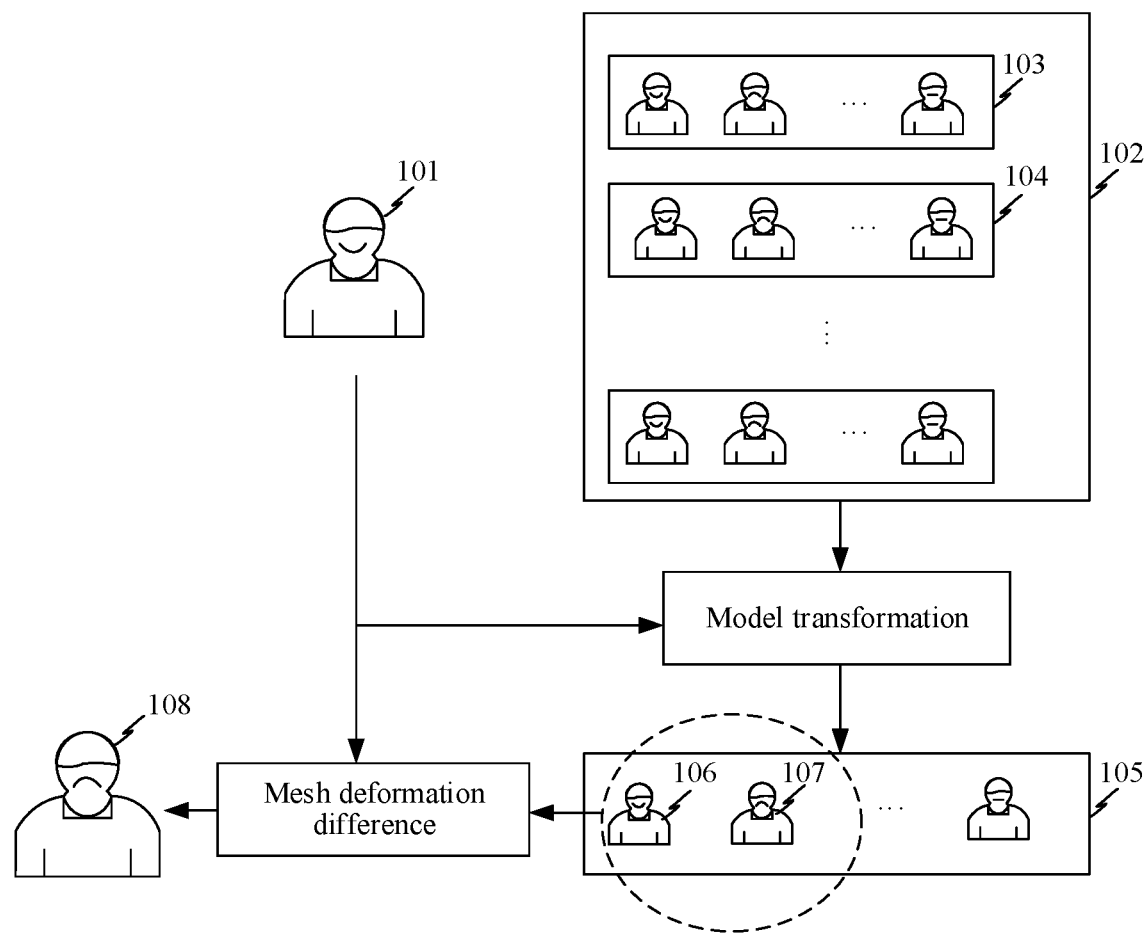
FIG. 1 is a schematic diagram of a method for generating an expression model according to an exemplary embodiment of this application.

FIG. 1 is a schematic diagram of a method for generating an expression model according to an exemplary embodiment of this application.

A reference expression model 101 is a facial model that is of a target object and corresponds to a first expression. A sample expression model set 102 includes n sample expression models of a sample object, where n is an integer greater than 1. The sample object may refer to one object or a plurality of objects. In this embodiment of this application, an example in which the sample object refers to a plurality of objects is taken for description. For example, a sample expression model set 103 includes a plurality of expression models of a sample object A, and a sample expression model set 104 includes a plurality of expression models of a sample object B. The sample object A and the sample object B are different objects. In some embodiments, since the reference expression model 101 needs to have certain universality to facilitate conversion to expression models of other expressions, in this embodiment of this application, the reference expression model 101 is a neutral expression model of the target object, that is, the first expression is an expression that cannot intuitively reflect positive or negative emotions. In some other embodiments, the first expression corresponding to the reference expression model 101 may be any expression.

Taking the target object of the reference expression model 101 as a generation target, model transformation is performed on the sample expression model set 102 to obtain a target expression model set 105. The target expression model set 105 includes n expression models of a approximate object. The similarity between the approximate object and the target object obtained by using this method is high, but the approximate object and the target object are not exactly the same.

A mesh deformation difference between a first expression model 106 and a second expression model 107 in the target expression model set 105 is determined, and mesh deformation is performed on the first expression model 101 according to the mesh deformation difference, to obtain a deformed expression model 108 of the target object. The first expression model 106 is a facial model that is of the approximate object and corresponds to the first expression, and the second expression model 107 is a facial model that is of the approximate object and corresponds to the second expression. For example, when the reference expression model 101 is used to represent a happy expression of the target object, the first expression model 106 is used to represent a happy expression of the approximate object, and the second expression model 107 is used to represent a sad expression of the approximate object, according to the mesh deformation difference between the first expression model 106 and the second expression model 107, mesh deformation is performed on the reference expression model 101 to obtain the deformed expression model 108. The deformed expression model 108 is used to represent a sad expression of the target object.

Figure 2:
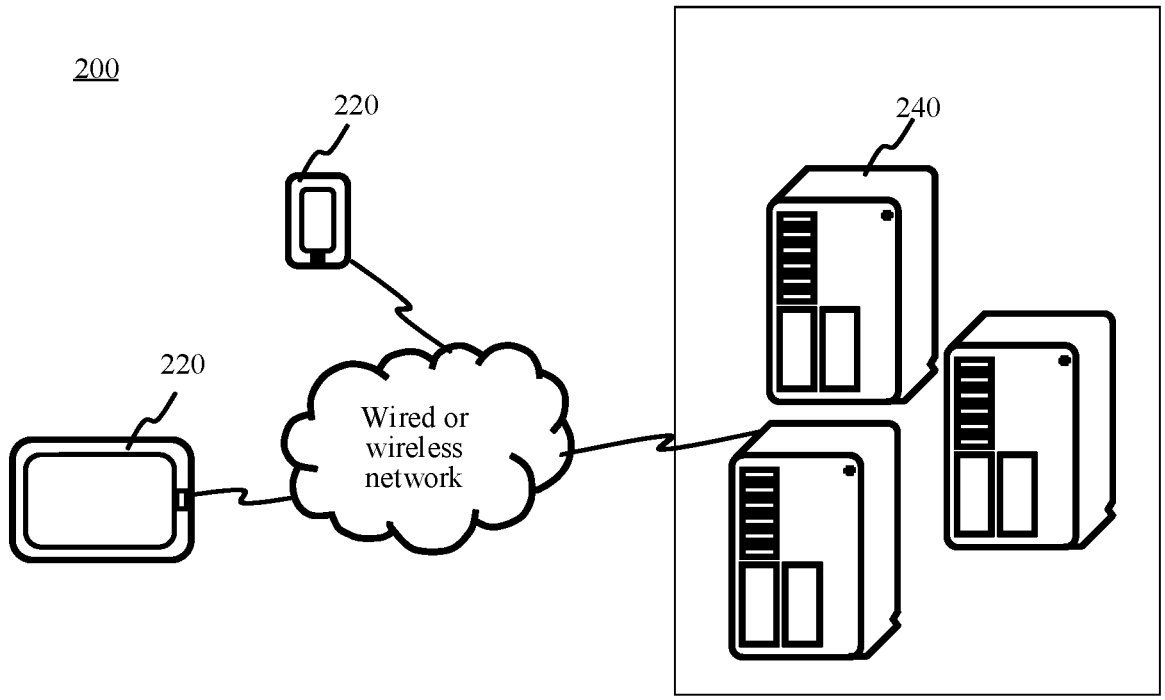
FIG. 2 is a schematic structural diagram of a computer system according to an exemplary embodiment of this application.

FIG. 2 is a schematic structural diagram of a computer system according to an exemplary embodiment of this application. The computer system 200 includes: a terminal 220 and a server 240.

An application related to expression model generation is installed on the terminal 220. The application can be a small program parasitic in the application (app), an independent application, or a web client. The terminal 220 is at least one of a smartphone, a tablet computer, an e-book reader, an MP3 player, an MP4 player, a laptop computer, and a desktop computer.

The terminal 220 is connected to the server 240 through a wireless network or a wired network.

The server 240 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The server 240 is used to provide background services for model generation applications and send information related to model generation to the terminal 220. In some embodiments, the server 240 undertakes the main calculation work and the terminal 220 undertakes the secondary calculation work; or the server 240 undertakes the secondary calculation work and the terminal 220 undertakes the main calculation work; or both the server 240 and the terminal 220 adopt a distributed computing architecture to perform collaborative computing.

In some embodiments, the server 240 may alternatively be implemented as a node in a blockchain system.

Figure 3:
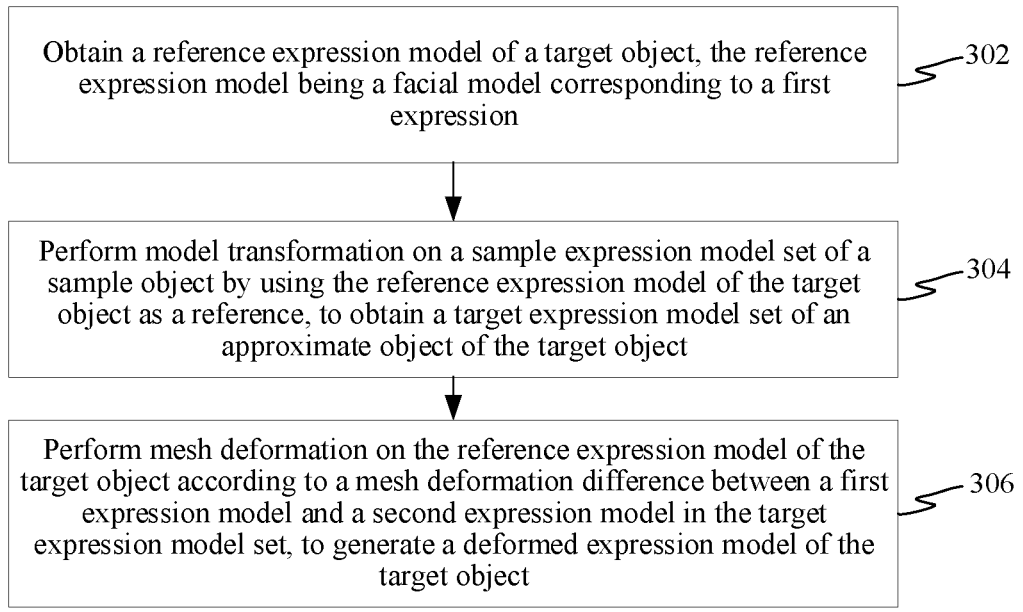
FIG. 3 is a schematic flowchart of a method for generating an expression model according to an exemplary embodiment of this application.

FIG. 3 is a schematic flowchart of a method for generating an expression model according to an exemplary embodiment of this application. The method may be performed by the computer system 100 shown in FIG. 1. the method includes:

Step 302: Obtain a reference expression model of a target object, the reference expression model being a facial model corresponding to a first expression.

In some embodiments, a dialog box is displayed on a terminal, and is used to request authorization for obtaining the reference expression model. In response to an authorization operation on the dialog box, the terminal obtains the reference expression model of the target object.

The target object is at least one of a human, an animal, a cartoon character, a robot, and an animated character.

In some embodiments, the reference expression model of the target object is a locally stored three-dimensional model.

In some embodiments, the reference expression model of the target object is obtained through a camera. For example, the terminal obtains an expression image of the target object through the camera; the terminal displays a dialog box; and in response to a confirmation operation on the dialog box, the terminal converts the expression image of the target object into the reference expression model of the target object.

In some embodiments, the reference expression model is formed by a polygon mesh (or referred to as a graphical element). The reference expression model may be formed by one type of polygon mesh or a plurality of types of polygon meshes. For example, the reference expression model is formed by only a quadrilateral mesh, or the reference expression model is formed by both a quadrilateral mesh and a triangular mesh. The reference expression model and the first expression model are only used to represent the first expression, and the object corresponding to the reference expression model may be any object and is not limited to the target object.

In some embodiments, expression models that are of different objects and correspond to the same expression have the same expression state. For example, expression models that are of different objects and correspond to the same expression have the same expression features. For example, expression features of an expression model 1 of an object A include an eye expression feature and a mouth corner expression feature, expression features of an expression model 2 of an object B also include an eye expression features and a mouth corner expression feature, the eye expression features of the object A and the object B are both used to represent raising of upper eyelids at inner corners of eyes, and the mouth corner expression features of the object A and the object B are both used to represent pull-down of mouth corners. It means that the expression features of the object A and the object B are the same, and the expression model 1 of the object A and the expression model 2 of the object B represent the same expression.

In some embodiments, the first expression includes but is not limited to at least one of an open-mouth expression, a closed-mouth expression, a smile expression, a no expression, an angry expression, and a sad expression. It may be understood that the first expression may alternatively be other expressions, and this application does not specifically limit the type of the first expression. In addition, the no expression may alternatively be referred to as a neutral expression.

Step 304: Perform model transformation on a sample expression model set of a sample object by using the reference expression model of the target object as a reference, to obtain a target expression model set.

The sample expression model set includes n sample expression models of a sample object, where n is a positive integer greater than 1. The sample object may refer to one object or a plurality of objects. In this embodiment of this application, an example in which the sample object refers to a plurality of objects is taken for description.

For example, the sample expression model set includes m sample objects, and each sample object corresponds to n sample expression models. For example, the sample expression models include m sample objects, an expression union of the m sample objects is taken, and m is a positive integer. For example, the sample expression models include a sample object 1 and a sample object 2, the sample object 1 corresponds to a sad expression model and a closed-mouth expression model, and the sample object 2 corresponds to an open-mouth expression model and a closed-mouth expression model. In this case, the sample expression model set includes three expression models of the sample object. The three expression models are the sad expression model, the closed-mouth expression model, and the open-mouth expression model.

In some embodiments, the sample expression models in the sample expression model set have the same topological structure. That is, the sample expression models in the sample expression model set have the same quantity of vertexes and the same connection relationships.

The sample expression model is a facial model corresponding to a sample expression. For example, a sample expression model A is a facial model corresponding to an open-mouth expression, and a sample expression model B is a facial expression corresponding to a closed-mouth expression. The sample expressions include at least a first expression and a second expression. In some embodiments, the sample expressions further include expressions other than the first expression and the second expression.

The target expression model set includes n expression models of a approximate object. A similarity between the approximate object and the target object is greater than a similarity threshold.

The similarity between the approximate object and the target object obtained in this embodiment of this application is high, but the approximate object and the target object are not the same. In some embodiments, the similarity between the approximate object and the target object is greater than the similarity threshold. In a practical situation, a similarity between facial feature points of the approximate object and the target object is greater than the similarity threshold. For example, the facial feature points include but are not limited to at least one of eyes, a tip of a nose, corners of a mouth, and eyebrows. Similarities between the facial feature points of the approximate object and the facial feature points of the target object are all greater than the similarity threshold. For example, a quantity of facial feature points whose similarity between the approximate object and the target object is greater than the similarity threshold is counted. When the quantity of facial feature points is greater than the quantity threshold, it is determined that the similarity between the facial feature points of the approximate object and the target object is greater than the similarity threshold. Alternatively, an average similarity between the facial feature points of the approximate object and the target object is counted. When the average similarity reaches the similarity threshold, it is determined that the similarity between the facial feature points of the approximate object and the target object is greater than the similarity threshold.

In some embodiments, the sample expression models in the sample expression model set are formed by polygon meshes.

In some embodiments, the expression models in the target expression model set are formed by polygon meshes.

In some embodiments, the approximate object is obtained by performing facial reconstruction on the sample object by using the target object as a reference. For example, the target object is converted into a target feature vector, and the sample object is converted into a sample feature vector; a target facial feature vector is extracted from the target feature vector, where the target facial feature vector is a feature vector related to a facial feature of the target object; the target facial feature vector and the sample feature vector are fused to obtain a similar feature vector of the approximate object; and a facial model is reconstructed according to the similar feature vector to obtain the approximate object.

Step 306: Perform mesh deformation on the reference expression model of the target object according to a mesh deformation difference between a first expression model and a second expression model in the target expression model set, to generate a deformed expression model of the target object.

The second expression model and the deformed expression model being facial models corresponding to a second expression, and the second expression being different from the first expression.

In some embodiments, the sample expressions in the target expression model set include at least the first expression and the second expression. The sample expressions in the target expression model set may also be expressions other than the first expression and the second expression.

The first expression model and the second expression model are both formed by polygon meshes. Although the first expression model and the second expression model both correspond to the same approximate object, the expressions corresponding to the first expression model and the second expression model are different. Therefore, there is a difference between the polygon meshes that constitute the first expression model and the second expression model. For example, the first expression model corresponds to a happy expression, and the second expression model corresponds to a no expression. In this case, there is a difference between the polygon meshes at mouth corners of the first expression model and the second expression model.

The mesh deformation difference between the first expression model and the second expression model in the target expression model set is transferable. In other words, for different objects, a mesh deformation difference between the expression models of different expressions is similar. For example, there is a mesh deformation difference 1 between the first expression model and the second expression model of the object A, there is a mesh deformation difference 2 between the first expression model and the second expression model of the object B, and a similarity between the mesh deformation difference 1 and the mesh deformation difference 2 is greater than a similarity difference threshold.

Based on the above, according to this embodiment, after the reference expression model of the target object is obtained, the target expression model set is first generated, where the target expression model set includes expression models of the approximate object. The deformed expression model of the target object is then generated according to the mesh deformation difference between the first expression model and the second expression model in the target model set. Due to the high similarity between the approximate object and the target object, the mesh deformation difference of the expression model of the approximate object can be transferred to the expression model of the target object, so that the expression effect of the deformed expression model of the target object is good and closer to the actual situation.

Figure 4:
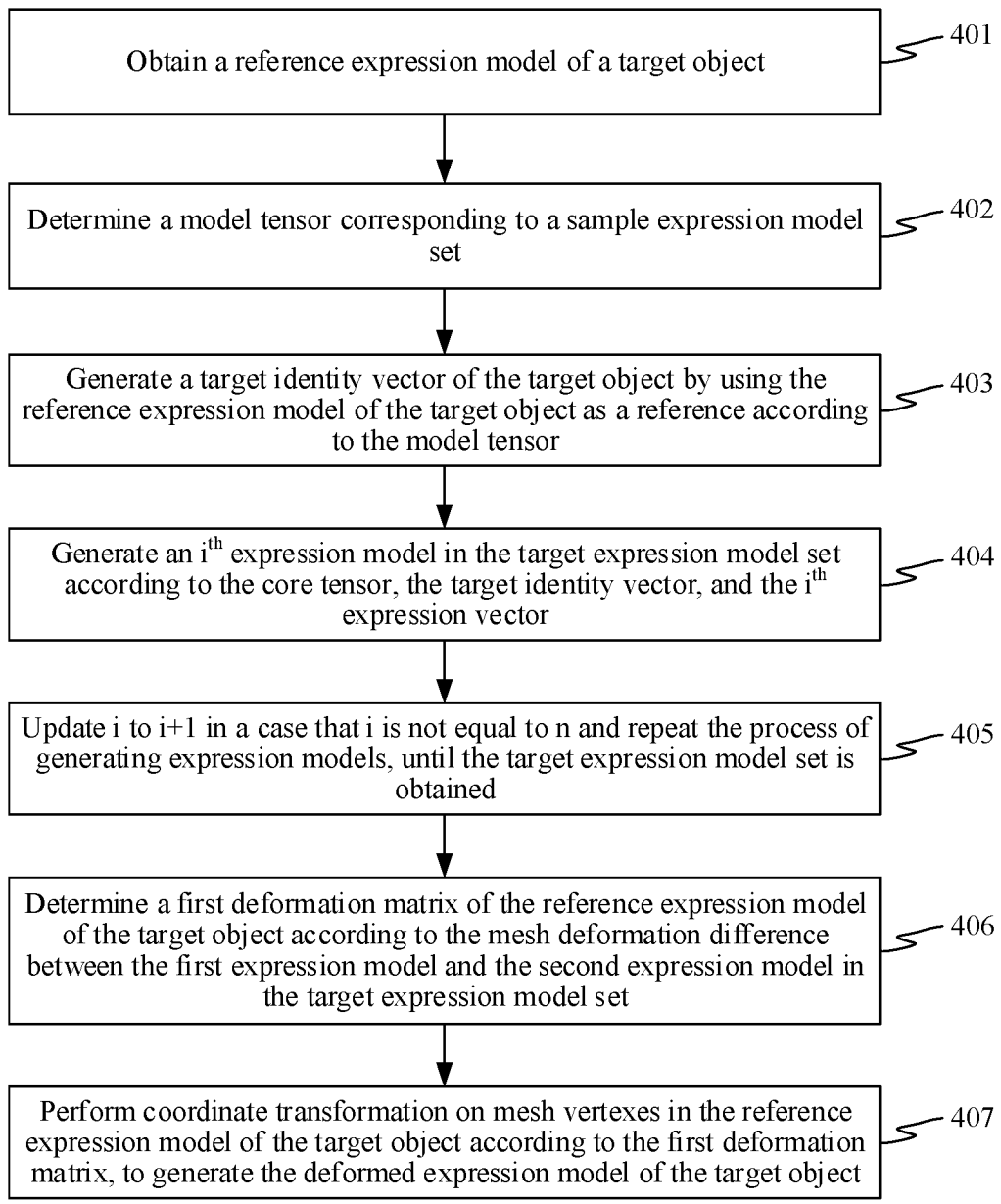
FIG. 4 is a schematic flowchart of a method for generating an expression model according to an exemplary embodiment of this application.

FIG. 4 is a schematic flowchart of a method for generating an expression model according to an exemplary embodiment of this application. The method may be performed by the computer system 100 shown in FIG. 1. the method includes:

Step 401: Obtain a reference expression model of a target object.

The target object is at least one of a human, an animal, a cartoon character, and a robot.

In some embodiments, the reference expression model of the target object is a locally stored three-dimensional model. The reference expression model of the target object is described in detail in the foregoing step 302, and details are not described herein again.

Step 402: Determine a model tensor corresponding to a sample expression model set.

For example, the sample expression model set includes m sample objects, each sample object corresponds to n sample expression models, and each sample expression model has V vertexes. In this case, each sample expression model may be expressed as a vector with a length of V×3, and the sample expression model set may be expressed as a model tensor of T=(V×3)×m×n.

The model tensor includes a core tensor, an identity matrix, and an expression matrix. In some embodiments, a Tucker tensor decomposition method (or referred to as a high-order singular value decomposition method) is used to decompose the model tensor to obtain the core tensor (also referred to as the core tensor), the identity matrix, and the expression matrix. For example, the model tensor: $T \simeq C_r \times \breve{U}_{id} \times \breve{U}_{exp}$. $C_r$ is the core tensor, $\breve{U}_{id}$ is the identity matrix, and $\breve{U}_{exp}$ is the expression matrix. The core tensor is a sub-tensor of the model tensor, the identity matrix is used to represent a coefficient matrix of an identity of a sample object in the sample expression model set, and the expression matrix is used to represent a coefficient matrix of an expression of a sample object the sample expression model set. In some embodiments, each row vector of the identity matrix is used to represent an identity of a sample object, or each column vector of the identity matrix is used to represent an identity of a sample object. Further, each row vector of the identity matrix is used to represent a shape and a position of facial features of a sample object, or each column vector of the identity matrix is used to represent a shape and a position of facial features of a sample object. In some embodiments, each row vector of the expression matrix is used to represent an expression, or each column vector of the expression matrix is used to represent an expression.

The identity matrix includes an identity vector corresponding to a sample object, and the expression matrix includes n expression vectors. When a clear set of identity vectors $\breve{W}_{id}^T$ and expression vectors $\breve{W}_{exp}^T$ are given, a facial model with clear identity and expression can be obtained. For example, a facial model: $V=C_r \times \breve{W}_{id}^T \times \breve{W}_{exp}^T$. The identity corresponding to the facial model V is the identity corresponding to $\breve{W}_{id}^T$, and the expression corresponding to the facial model V is the expression corresponding to $\breve{W}_{exp}^T$.

Step 403: Generate a target identity vector of the target object by using the reference expression model of the target object as a reference according to the model tensor.

In the next steps, if the deformed expression model of the target object is to be obtained, a approximate object needs to be generated in a targeted manner, so that a similarity between the approximate object and the target object is greater than a similarity threshold. In addition, model transfer is performed on the reference expression model of the target object by using a mesh deformation difference of an expression model of the approximate object, to obtain the deformed expression model that is of the target object and corresponds to the second expression. Therefore, the next steps need to fix the expression vector $\breve{W}_{exp}^T$ and estimate the identity vector $\breve{W}_{id}^T$. In this case, solving the identity vector corresponding to the approximate object can be optimized to the following problem:

$$\arg\min\left[\frac{1}{2}\|A*w-b\|_F^2 + \lambda\sum_{i=1}^{N}\left(\frac{W_i}{\sigma_i}\right)^2\right].$$

argmin[ ] represents a value of w when the formula in square brackets takes the minimum value, w is the identity vector corresponding to the approximate object, b represents a target object vector corresponding to the target object, σ is a coefficient variance of the identity matrix $\breve{U}_{id}$, $A=C_r \times \breve{W}_{exp}^T$, and λ is a parameter in an interval [0, 1].

Figure 5:
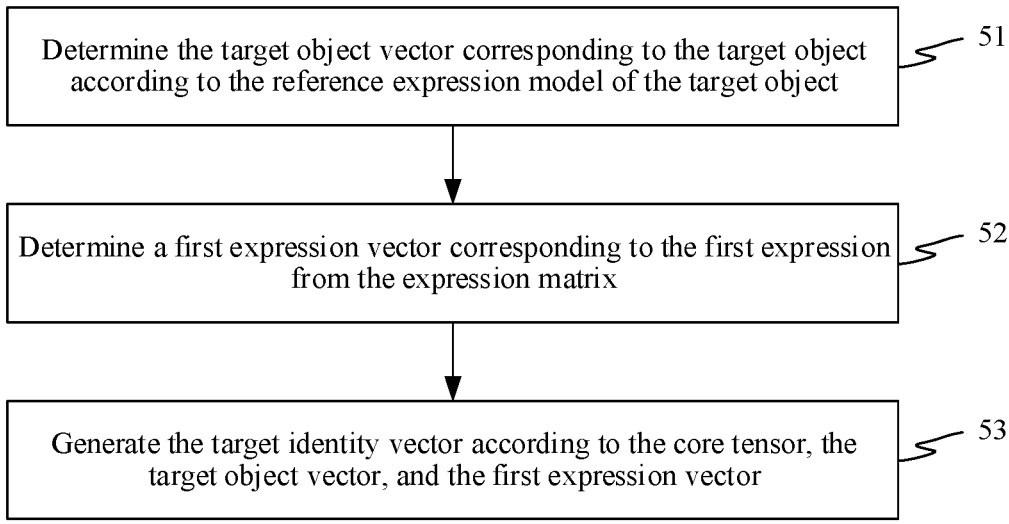
FIG. 5 is a schematic flowchart of calculating a target identity vector according to an exemplary embodiment of this application.
Figure 6:
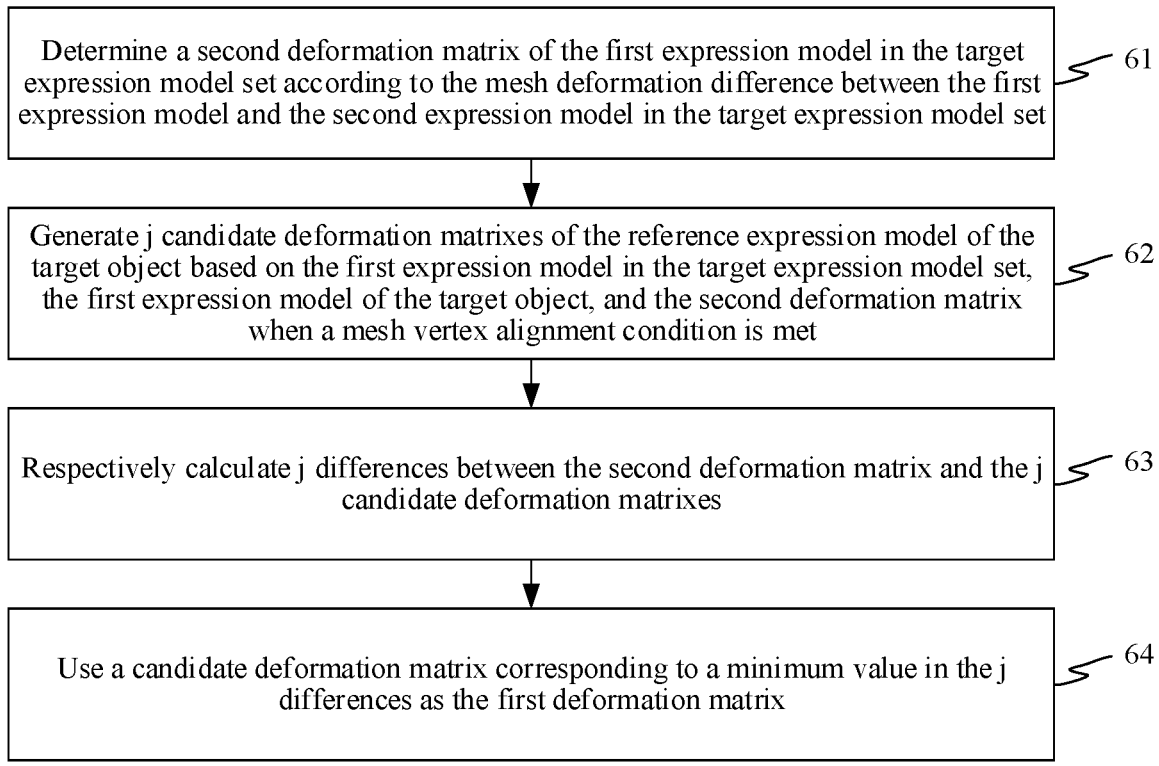
FIG. 6 is a schematic flowchart of generating a first deformation matrix according to an exemplary embodiment of this application.

To solve the foregoing problem, as shown in FIG. 5, this step may be divided into the following sub-steps:

Sub-step 51: Determine the target object vector corresponding to the target object according to the reference expression model of the target object.

In some embodiments, facial feature vectors of the reference expression model of the target object are extracted; and the foregoing facial feature vectors are combined to obtain the target object vector corresponding to the target object.

Sub-step 52: Determine a first expression vector corresponding to the first expression from the expression matrix.

In some embodiments, the expression matrix includes expression vectors distributed by rows, and expression vectors in different rows correspond to different expressions. In some embodiments, the expression matrix includes expression vectors distributed in columns, and expression vectors in different columns correspond to different expressions.

Sub-step 53: Generate the target identity vector according to the core tensor, the target object vector, and the first expression vector.

In some embodiments, a vector product of the core tensor and the first expression vector is calculated; and the target identity vector is generated based on the product of the vector product and the target object vector. For example, the vector product is $A=C_r \times \breve{W}_{exp}^T$, where $C_r$ represents the core tensor and $\breve{W}_{exp}^T$ represents the first expression vector. In this case, the target identity vector:

$$w=(A^T*A+\lambda*\mathfrak{R})^{-1}*A^T*b.$$

λ is a parameter in the interval [0, 1], $\mathfrak{R}$ is a diagonal matrix formed by $$\frac{1}{\sigma},$$

σ is a coefficient variance of the identity matrix $Ŭ_{id}$, and b represents the target object vector corresponding to the target object.

Step 404: Generate an $i^{th}$ expression model in the target expression model set according to the core tensor, the target identity vector, and the $i^{th}$ expression vector.

In some embodiments, the $i^{th}$ expression model in the target expression model set is generated according to a product of the core tensor, the target identity vector, and the $i^{th}$ expression vector. For example, the $i^{th}$ expression model of the sample object: $V=C_r \times w \times \overset{\smile}{W}_{expi}{}^T$, where $C_r$ represents the core tensor, w is the target identity vector, $\overset{\smile}{W}_{expi}{}^T$ is the $i^{th}$ expression vector, and i is a positive integer and starts from 1.

Step 405: Update i to i+1 when i is not equal to n and repeat the process of generating expression models, until the target expression model set is obtained.

The target expression model set includes n sample expression models of the sample object, where n is a positive integer greater than 1. i is updated to i+1 when i is not equal to n, and each expression vector in the expression matrix is traversed, to obtain the target expression model set.

Step 406: Determine a first deformation matrix of the reference expression model of the target object according to the mesh deformation difference between the first expression model and the second expression model in the target expression model set.

The first deformation matrix is used to perform coordinate transformation on mesh vertexes in the first expression model of the target object.

For example, this step includes the following sub-steps:

Sub-step 61: Determine a second deformation matrix of the first expression model in the target expression model set according to the mesh deformation difference between the first expression model and the second expression model in the target expression model set.

The second deformation matrix is used to perform coordinate transformation on mesh vertexes in the first expression model in the target expression model set, to obtain the second expression model in the target expression model set.

Sub-step 62: Generate j candidate deformation matrixes of the reference expression model of the target object based on the first expression model in the target expression model set, the first expression model of the target object, and the second deformation matrix when a mesh vertex alignment condition is met.

The mesh vertex alignment condition is used to indicate that common vertexes of a mesh on the first expression model are at same locations before and after the mesh deformation of the first expression model, and j is a positive integer. The mesh vertex alignment condition is:

$$T_j v_i + d_j = T_k v_i + d_k = \tilde{v}.$$

$v_i$ is a common vertex of a mesh j and a mesh k, $T_j$ is a deformation matrix of the mesh j, $T_k$ is a deformation matrix of the mesh k, $d_j$ is a translation parameter of the mesh j, and $d_k$ is a translation parameter of the mesh k. $\tilde{v}$ is a vertex obtained after mesh deformation is performed on the common vertex $v_i$.

In some embodiments, a mesh mapping relationship between the first expression model in the target expression model set and the reference expression model of the target object is obtained; and the candidate deformation matrixes is generated according to the second deformation matrix and the mesh mapping relationship when the mesh vertex alignment condition is met.

Sub-step 63: Respectively calculate j differences between the second deformation matrix and the j candidate deformation matrixes.

For example, the difference between the second deformation matrix and the candidate deformation matrix is calculated to be $\|S_{sj}-T_{tj}\|_F^2$.

Sub-step 64: Use a candidate deformation matrix corresponding to a minimum value in the j differences as the first deformation matrix.

For example, the minimum value in the j differences is calculated as follows:

$$\min_{T_1+d_1 \ldots T_{|T|}+d_{|T|}} \sum_{j=1}^{|M|} \|S_{sj} - T_{tj}\|_F^2,$$

and $$T_j v_i + d = T_k v_i + d_k.$$

$S_{sj}$ is the second deformation matrix of the mesh j of the first expression model in the target expression model set, and $T_{tj}$ is the candidate deformation matrix of the mesh j of the reference expression model of the target object.

Step 407: Perform coordinate transformation on mesh vertexes in the reference expression model of the target object according to the first deformation matrix, to generate the deformed expression model of the target object.

Coordinate transformation is used to change coordinates of mesh vertexes in the reference expression model of the target object. For example, coordinates of a mesh vertex A are (2, 5, 4). After coordinate transformation is performed on the mesh vertex A according to the first deformation matrix, the obtained mesh vertex B is (5, 7, 8).

In some embodiments, in addition to generating a deformed expression model of the target object, a plurality of expression models of the target object may be further generated. For example, mesh deformation is performed on the first expression model in the target expression model set according to mesh deformation differences between the first expression model in the target expression model set and other expression models in the target expression model set, to generate an expression model set of the target object.

For example, expression models in the expression model set are arranged to generate an expression model sequence; and the expression model sequence is rendered to obtain a facial video of the target object.

Based on the above, according to this embodiment, after the reference expression model of the target object is obtained, the target expression model set is first generated, where the target expression model set includes expression models of the approximate object. The deformed expression model of the target object is then generated according to the mesh deformation difference between the first expression model and the second expression model in the target model set. Due to the high similarity between the approximate object and the target object, the mesh deformation difference of the expression model of the approximate object can be transferred to the expression model of the target object, so that the expression effect of the deformed expression model of the target object is good and closer to the actual situation.

In this embodiment, the target expression model set corresponding to the target object is obtained through the target identity vector. Since the information provided by the reference expression model of the target object is used in the facial reconstruction process, the approximate object has more features of the target object. Therefore, the similarity between the approximate object and the target object is high, so that the deformed expression model of the target object is more natural and the face is more realistic.

According to the method provided in this embodiment, the expression model is decomposed into the core tensor, the identity matrix, and the expression matrix through tensor decomposition, improving flexibility and accuracy of identity transformation and expression transformation.

According to the method provided in this embodiment, the target object vector corresponding to the target object is determined through the reference expression model, and the target identity vector of the target object is determined based on the target object vector, thereby expressing the facial features of the target object through the target identity vector. While the facial features are maintained, the expression is adjusted, improving the accuracy of expression conversion.

According to the method provided in this embodiment, the target identity vector is determined through the product of the core tensor, the expression vector, and the object vector, thereby improving the efficiency of determining the target identity vector.

According to the method provided in this embodiment, the mesh deformation difference between the first expression model and the second expression model is determined, and the mesh deformation difference is applied to the reference expression model of the target object, thereby obtaining the deformed expression model of the target object. This improves the naturalness of the transformation of the deformed expression model and improves the expression transformation effect.

Figure 7:
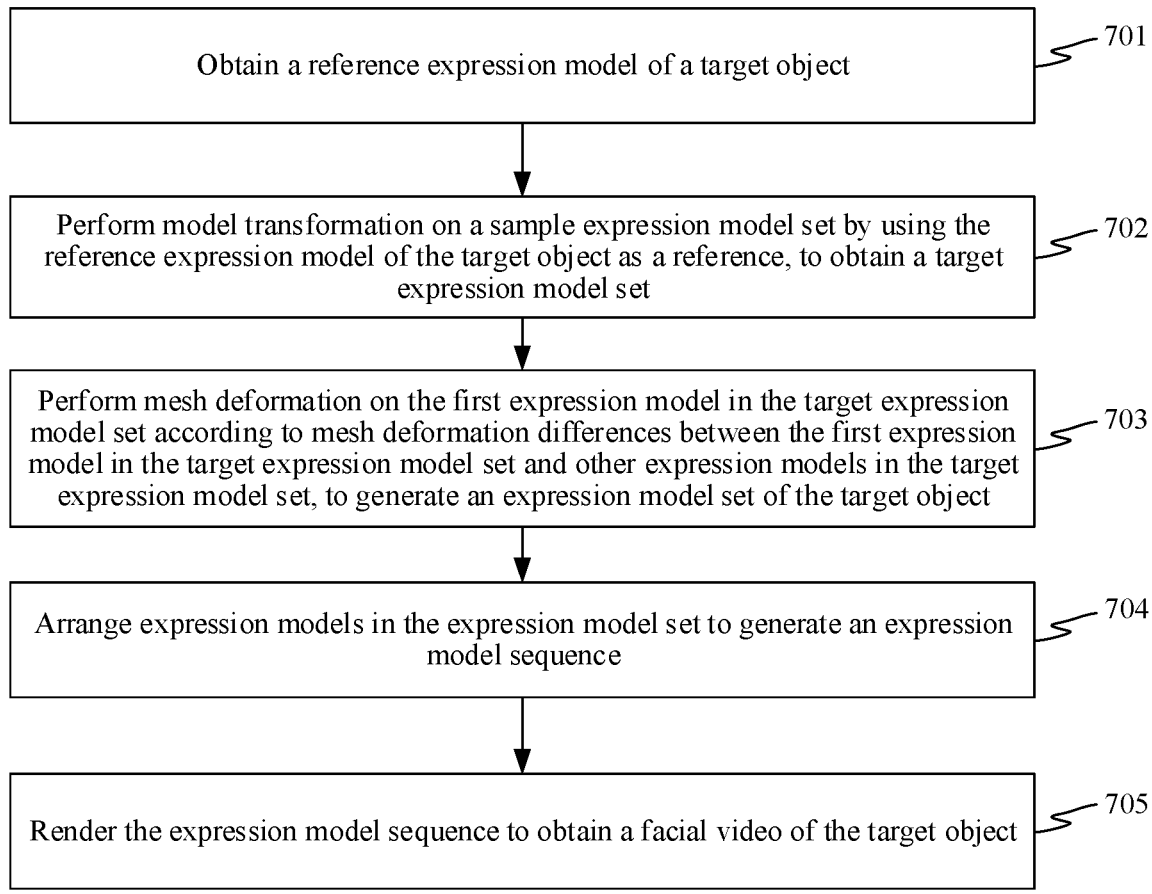
FIG. 7 is a schematic flowchart of a method for generating an expression video according to an exemplary embodiment of this application.

In the following embodiment, a generated expression model is used to implement facial driving and generate a facial video. FIG. 7 is a schematic flowchart of a method for generating an expression video according to an exemplary embodiment of this application. The method may be performed by the computer system 100 shown in FIG. 1. the method includes:

Step 701: Obtain a reference expression model of a target object.

The target object is at least one of a human, an animal, a cartoon character, and a robot.

In some embodiments, a first expression model of the target object is a locally stored model.

Step 702: Perform model transformation on a sample expression model set by using the reference expression model of the target object as a reference, to obtain a target expression model set.

The sample expression model set includes n sample expression models of a sample object, where n is a positive integer greater than 1. The sample object may refer to one object or a plurality of objects. In this embodiment of this application, an example in which the sample object refers to a plurality of objects is taken for description.

The sample expression model is a facial model corresponding to a sample expression. For example, a sample expression model A is a facial model corresponding to an open-mouth expression, and a sample expression model B is a facial expression corresponding to a closed-mouth expression.

The target expression model set includes n expression models of a approximate object. A similarity between the approximate object and the target object is greater than a similarity threshold.

In some embodiments, a similarity between facial feature points of the approximate object and the target object is greater than the similarity threshold.

The approximate object is obtained by performing facial reconstruction on the sample object.

Step 703: Perform mesh deformation on the first expression model in the target expression model set according to mesh deformation differences between the first expression model in the target expression model set and other expression models in the target expression model set, to generate an expression model set of the target object.

The expression model set of the target object includes at least two expression models of the target object, and the expression models in the expression model set of the target object are used to represent different expressions.

Step 704: Arrange expression models in the expression model set to generate an expression model sequence.

In some embodiments, expression models are extracted from the expression model set according to a model order; and the foregoing extracted expression models are arranged according to the model order to generate the expression model sequence. The model order includes the expression models in the expression model sequence and the arrangement order of the expression models. For example, if the model order is "expression model A-expression model C-expression model T", the expression model A, the expression model C, and the expression model T are extracted from the expression model set according to the model order, and the extracted expression models are arranged according to model sequence.

In some embodiments, some expression models in the expression model set are arranged to generate the expression model sequence. There are duplicate expression models in the expression model sequence, or there are no duplicate expression models in the expression model sequence.

In some embodiments, all expression models in the expression model set are arranged to generate the expression model sequence. There are duplicate expression models in the expression model sequence, or there are no duplicate expression models in the expression model sequence.

Step 705: Render the expression model sequence to obtain a facial video of the target object.

For example, the expression models in the expression model sequence are rendered frame by frame to obtain the video of the target object.

Based on the above, according to this embodiment, after the reference expression model of the target object is obtained, the target expression model set is first generated, where the target expression model set includes expression models of the approximate object. An expression model set of the target object is then generated according to a mesh deformation difference between the first expression model and another expression model in the target model set, and the facial video of the target object is generated according to the expression model set. Due to the high similarity between the approximate object and the target object, the mesh deformation difference of the expression model of the approximate object can be transferred to the expression model of the target object, so that the facial video is natural.

The method for generating an expression model provided in the foregoing embodiments can also be used to generate other types of models, for example, to generate a full-body model.

Figure 8:
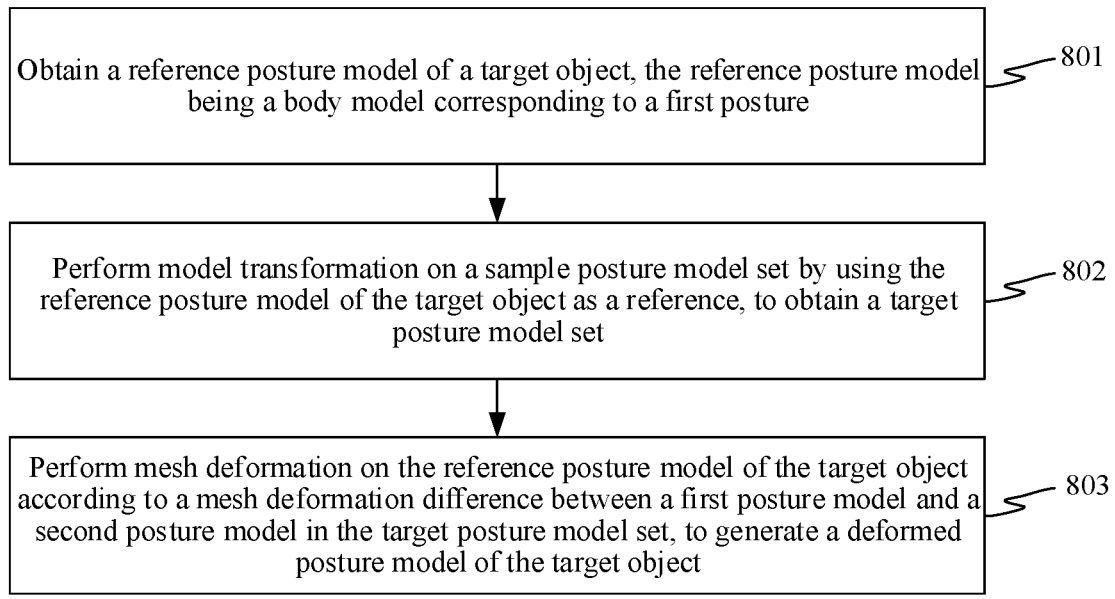
FIG. 8 is a schematic flowchart of a method for generating a full-body model according to an exemplary embodiment of this application.

FIG. 8 is a schematic flowchart of a method for generating a full-body model according to an exemplary embodiment of this application. The method may be performed by the computer system 100 shown in FIG. 1. the method includes:

Step 801: Obtain a reference posture model of a target object, the reference posture model being a body model corresponding to a first posture.

In some embodiments, the first posture model of the target object is a locally stored model.

In some embodiments, the first posture model of the target object is obtained through a camera. For example, the terminal obtains a posture image of the target object through the camera; the terminal displays a dialog box; and in response to a confirmation operation on the dialog box, the terminal converts the posture image of the target object into the first posture model of the target object.

In some embodiments, the first posture model is formed by a polygon mesh. The first posture model may be formed by one type of polygon mesh or a plurality of types of polygon meshes. For example, the first posture model is formed by only a quadrilateral mesh, or the first posture model is formed by both a quadrilateral mesh and a triangular mesh. The first posture model and the reference posture model are used to represent the first posture.

Step 802: Perform model transformation on a sample posture model set by using the reference posture model of the target object as a reference, to obtain a target posture model set.

The sample posture model set includes n sample posture models of a sample object, where n is an integer greater than 1. The sample object may refer to one object or a plurality of objects. In this embodiment of this application, an example in which the sample object refers to a plurality of objects is taken for description.

In some embodiments, the sample posture models in the sample posture model set have the same topological structure, that is, the sample posture models in the sample posture model set have the same quantity of vertexes and the same connection relationships.

The sample posture model is a full-body model corresponding to a sample posture. For example, a sample posture model A is a full-body model corresponding to a jumping posture, and a sample posture model B is a full-body posture corresponding to a squatting posture.

The target posture model set includes n posture models of a approximate object. A similarity between the approximate object and the target object is greater than a similarity threshold.

In some embodiments, a similarity between full-body feature points of the approximate object and the target object is greater than the similarity threshold. For example, the full-body feature points include but are not limited to at least one of a nose, a neck, extremities, elbows, and knees. Similarities between the full-body feature points of the approximate object and the full-body feature points of the target object are all greater than the similarity threshold. For example, a quantity of full-body feature points whose similarity between the approximate object and the target object is greater than the similarity threshold is counted. When the quantity of full-body feature points is greater than the quantity threshold, it is determined that the similarity between the full-body feature points of the approximate object and the target object is greater than the similarity threshold.

In some embodiments, the sample posture models in the sample posture model set are formed by polygon meshes.

In some embodiments, the posture models in the target posture model set are formed by polygon meshes.

The approximate object is obtained by performing full-body reconstruction on the sample object. For example, full-body reconstruction is performed on the sample object by using the target object as a full-body reconstruction target.

Step 803: Perform mesh deformation on the reference posture model of the target object according to a mesh deformation difference between a first posture model and a second posture model in the target posture model set, to generate a deformed posture model of the target object.

The second posture model and the deformed posture model being full-body models corresponding to a second posture, and the second posture being different from the first posture.

In some embodiments, the sample postures in the target posture model set include at least the first posture and the second posture. The sample postures in the target posture model set may also be postures other than the first posture and the second posture.

The first posture model and the second posture model are both formed by polygon meshes. Although the first posture model and the second posture model both correspond to the same approximate object, the postures corresponding to the first posture model and the second posture model are different. Therefore, there is a difference between the polygon meshes that constitute the first posture model and the second posture model. For example, the first posture model corresponds to a standing posture, and the second posture model corresponds to a squatting posture. In this case, there is a difference between the polygon meshes at legs of the first posture model and the second posture model.

The mesh deformation difference between the first posture model and the second posture model in the target posture model set is transferable. In other words, for the first posture model and the second posture model of different objects, a mesh deformation difference between the first posture model and the second posture model is similar.

Based on the above, according to this embodiment, after the reference posture model of the target object is obtained, the target posture model set is first generated, where the target posture model set includes posture models of the approximate object. The deformed posture model of the target object is then generated according to the mesh deformation difference between the first posture model and the second posture model in the target model set. Due to the high similarity between the approximate object and the target object, the mesh deformation difference of the posture model of the approximate object can be transferred to the posture model of the target object, so that the posture effect of the deformed posture model of the target object is good and closer to the actual situation.

Figure 9:
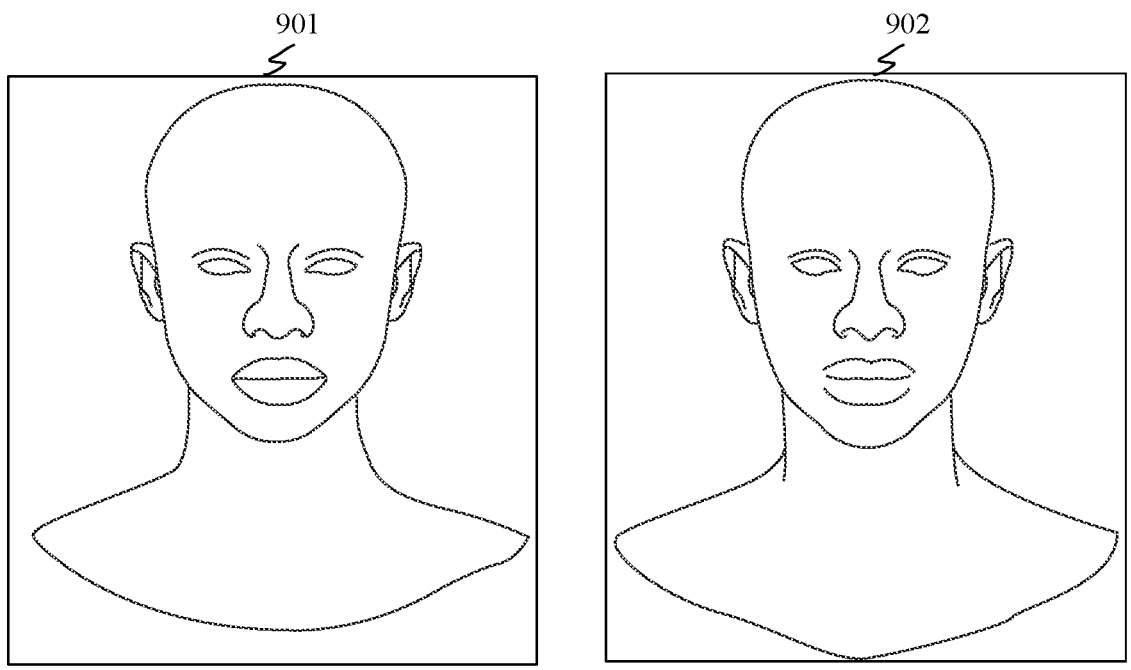
FIG. 9 is a model comparison diagram according to an exemplary embodiment of this application.
Figure 11:
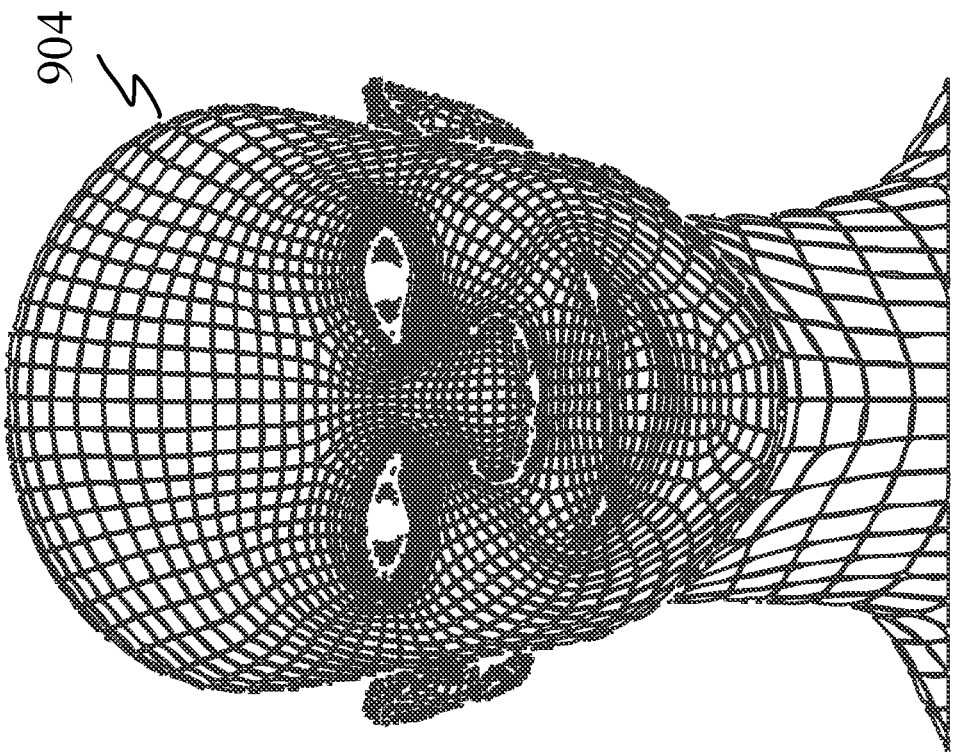
FIG. 11 is a schematic diagram of a smile expression model according to an exemplary embodiment of this application.
Figure 10:
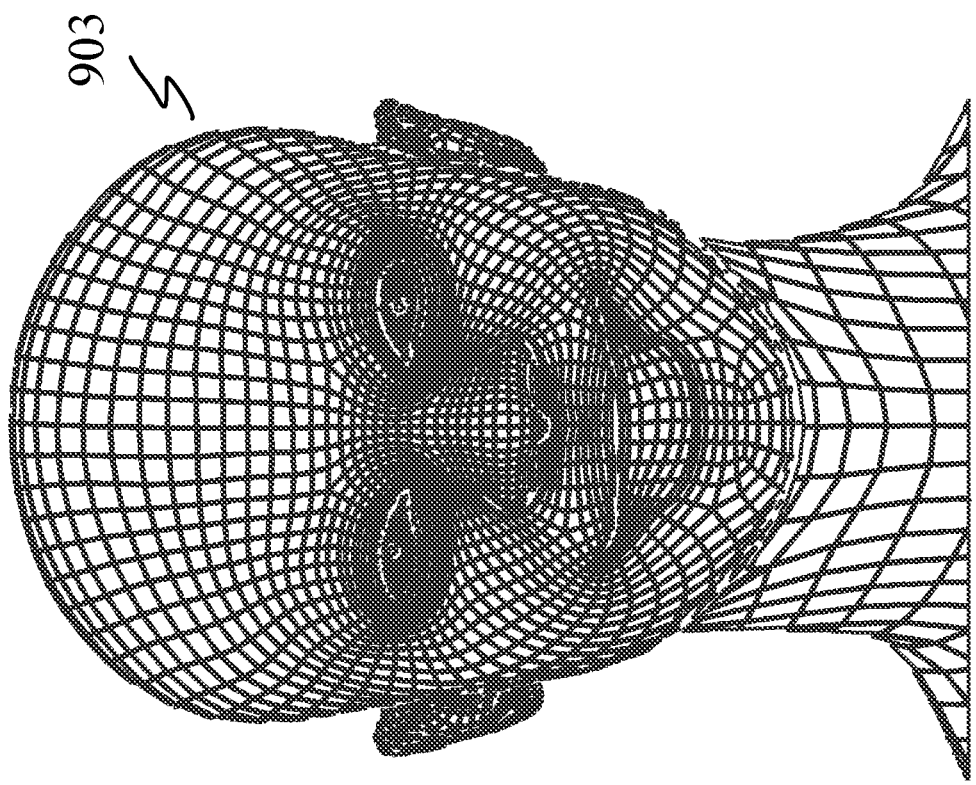
FIG. 10 is a schematic diagram of a smile expression model according to an exemplary embodiment of this application.
Figure 13:
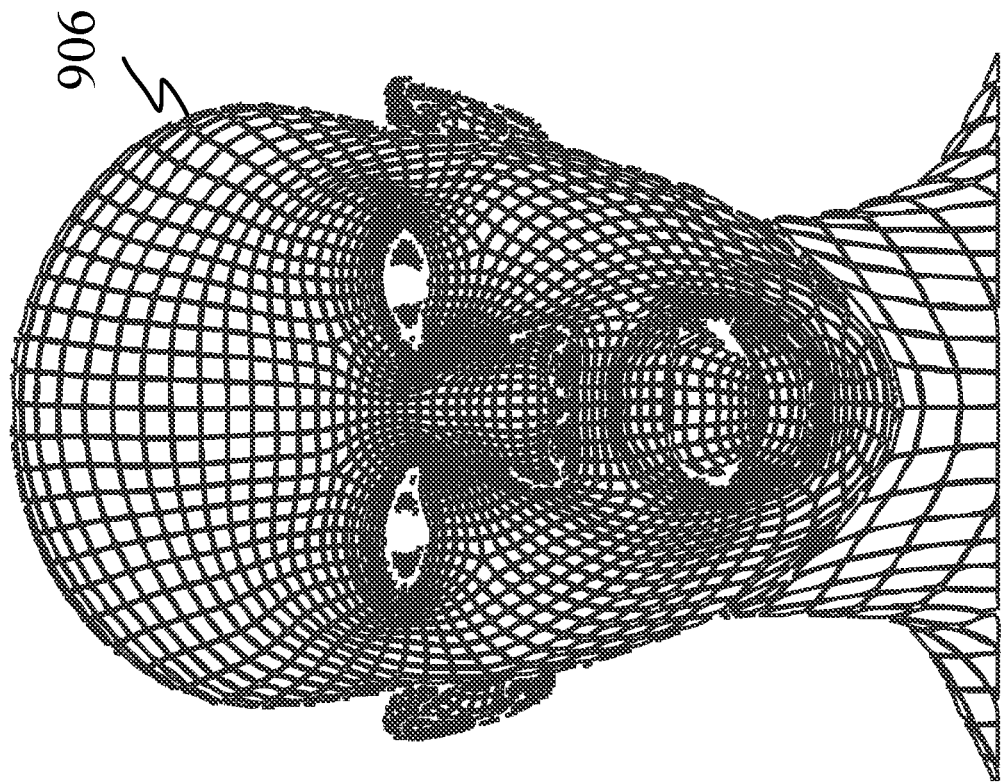
FIG. 13 is a schematic diagram of an open-mouth expression model according to an exemplary embodiment of this application.
Figure 12:
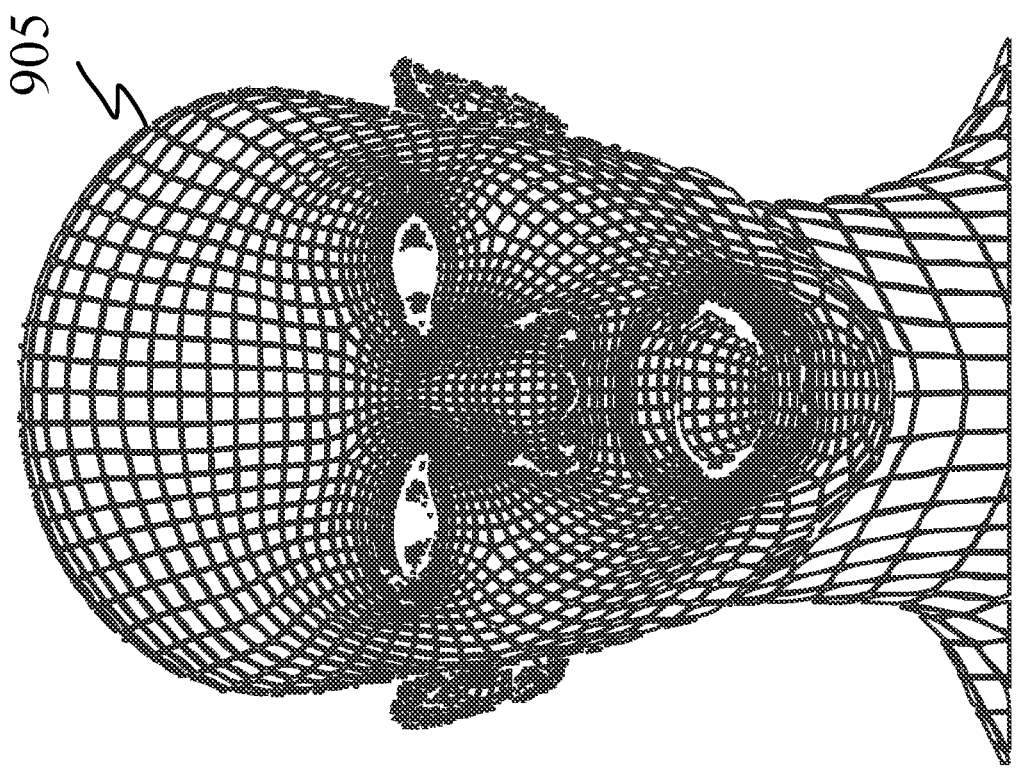
FIG. 12 is a schematic diagram of an open-mouth expression model according to an exemplary embodiment of this application.

FIG. 9 is a model comparison diagram according to an embodiment of this application.

In FIG. 9, the left side is an input target object 901, and the right side is a approximate object 902 obtained by performing facial reconstruction on a sample object according to the method for generating an expression model provided in the embodiments of this application. It can be seen from the comparison in FIG. 9 that facial features and facial shapes of the target object 901 and the approximate object 902 are highly similar. The target object 901 is processed according to the method for generating an expression model provided in the embodiments of this application, to obtain a smile expression model 903 and an open-mouth expression model 905 of the target object 901. A related technology is used to process the target object 901, to obtain a smile expression model 904 and an open-mouth expression model 906 of the target object 901.

The smile expression model 903 and the smile expression model 904 are compared, and it can be seen that a lip area of the smile expression model 904 has a poor deformation curve, and corners of the mouth stretch unnaturally to both sides. A mouth area of the smile expression model 903 has a better deformation curve, and corners of the mouth stretch to both sides more naturally.

The open-mouth expression model 905 and the open-mouth expression model 906 are compared, and it can be seen that cheeks of the open-mouth expression model 906 have unnatural depressions on both sides, and the expression effect is poor. The open-mouth expression model 905 does not have the foregoing depression, and the expression is more natural.

To sum up, compared with the related technology, the method for generating an expression model provided in the embodiments of this application can provide more natural expressions.

Figure 14:
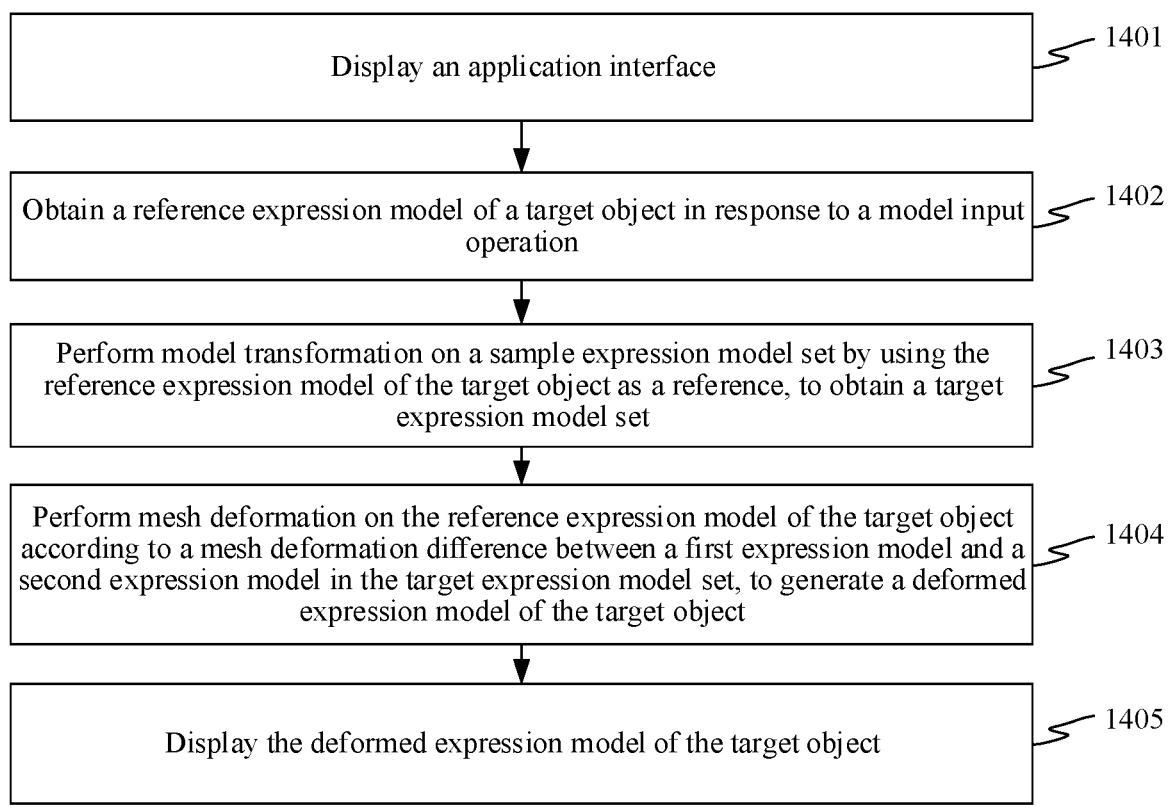
FIG. 14 is a schematic flowchart of a method for generating an expression model according to an exemplary embodiment of this application.

FIG. 14 is a schematic flowchart of a method for generating an expression model according to an exemplary embodiment of this application. The method includes:

Step 1401: Display an application interface.

The application interface is an interface of the application related to expression model generation.

In some embodiments, a camera control is displayed on the application interface; in response to a trigger operation on the camera control, a camera dialog box is displayed, where the camera dialog box is used to determine whether to turn on the camera of the terminal; and in response to a confirmation operation on the camera dialog box, the camera of the terminal is turned on.

In some embodiments, a model selection control is displayed on the application interface; in response to a trigger operation on the model selection control, a model selection dialog box is displayed, where the model selection dialog box is used to determine whether querying candidate expression models is allowed, and the candidate expression models are stored in the terminal; in response to a confirmation operation on the model selection dialog box, the candidate expression models are displayed; and in response to a selection operation on a first expression model in the candidate expression models, a reference expression model of a target object is determined.

Step 1402: Obtain the reference expression model of the target object in response to a model input operation For example, a dialog box is displayed on the application interface; and the reference expression model of the target object is obtained in response to the model input operation on the dialog box.

In some embodiments, the reference expression model of the target object is obtained through a camera. For example, the terminal obtains an expression image of the target object through the camera; the terminal displays a dialog box; and in response to a confirmation operation on the dialog box, the terminal converts the expression image of the target object into the reference expression model of the target object.

In some embodiments, the reference expression model of the target object is a locally stored three-dimensional model.

The reference expression model is a facial model corresponding to a first expression.

Step 1403: Perform model transformation on a sample expression model set by using the reference expression model of the target object as a reference, to obtain a target expression model set.

The sample expression model set includes n sample expression models of the sample object, where n is a positive integer greater than 1. The sample object may refer to one object or a plurality of objects.

In some embodiments, the sample expression models in the sample expression model set have the same topological structure. That is, the sample expression models in the sample expression model set have the same quantity of vertexes and the same connection relationships.

Step 1404: Perform mesh deformation on the reference expression model of the target object according to a mesh deformation difference between a first expression model and a second expression model in the target expression model set, to generate a deformed expression model of the target object.

The sample expression model set includes n sample expression models of a sample object, the target expression model set includes n expression models of a approximate object, and the approximate object is obtained by performing facial reconstruction on the sample object by using the target object as a reference.

In some embodiments, the sample expressions in the target expression model set include at least the first expression and the second expression. The sample expressions in the target expression model set may also be expressions other than the first expression and the second expression.

The second expression model and the deformed expression model being facial models corresponding to a second expression. The second expression is different from the first expression. The second expression is an expression selected by the object.

Step 1405: Display the deformed expression model of the target object.

For example, the reference expression model of the target object is used to represent an open-mouth expression of the target object, and the deformed expression model of the target object is used to represent a smile expression of the target object.

Based on the above, according to this embodiment, after the reference expression model of the target object is obtained, the target expression model set is first generated, where the target expression model set includes expression models of the approximate object. The deformed expression model of the target object is then generated according to the mesh deformation difference between the first expression model and the second expression model in the target model set. This embodiment can be applied in an application, to generate other expressions of the target object through one expression of the target object. The generated expressions are more realistic and have good expression effects.

In an optional implementation of this application, the method for generating an expression model provided in the embodiments of this application can be applied to game scenarios. For example, the method for generating an expression model is applied to a "face pinching" system, image generation of game objects, and the like.

Figure 15:
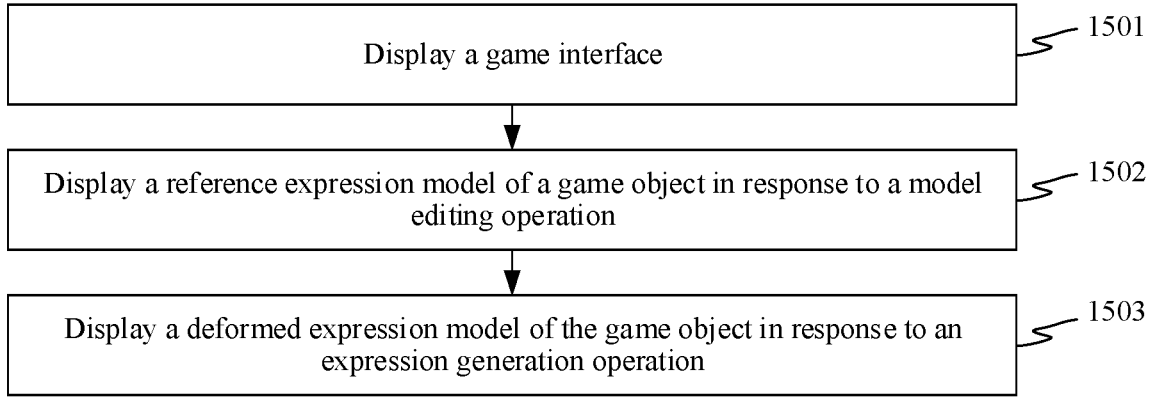
FIG. 15 is a schematic flowchart of a method for generating an expression model according to an exemplary embodiment of this application.

FIG. 15 is a schematic flowchart of a method for generating an expression model according to an exemplary embodiment of this application. The method includes:

Step 1501: Display a game interface.

In some embodiments, the game interface includes an initial model of a game object, and the initial model is a preset face model.

In some embodiments, the game interface includes a game model editing tab, which is used to adjust parameters of the initial model of the game object. For example, the game interface includes a face shape editing tab, and the object can adjust the face shape of the initial model in the face shape editing tab. The foregoing face shape includes but is not limited to at least one of Chinese character face, round face, long face, oval face, and oval face. For example, the game interface includes an eye editing tab, and the object can adjust at least one of a size, a shape, and a pupil color of the eyes of the initial model in the eye editing tab. For example, the game interface includes a nose editing tab, and the object can adjust at least one of a type, a shape, a size, a height, and a length of the nose of the initial model in the nose editing tab.

Step 1502: Display a reference expression model of a game object in response to a model editing operation.

The model editing operation is used to adjust the shape of the initial model of the game object.

In some embodiments, content of a mouth tab is displayed; and in response to a mouth adjustment operation, a mouth corner arc of the initial model of the game object is adjusted to obtain a first expression model of the game object. For example, when the corners of the mouth of the initial model of the game object are pulled up, a smile expression model of the game object is obtained.

In some embodiments, content of an eyebrow tab is displayed; and in response to an eyebrow adjustment operation, an eyebrow shape of the initial model of the game object is adjusted to obtain a reference expression model of the game object. For example, when the eyebrows of the initial model of the game object are raised, an angry expression model of the game object is obtained.

Step 1503: Display a deformed expression model of the game object in response to an expression generation operation.

In some embodiments, an expression generation tab is further displayed on the game interface. The expression generation tab includes expression generation controls corresponding to at least two second expressions. For example, the expression generation control includes but is not limited to at least one of a smile expression generation control, an angry expression generation control, a sad expression generation control, and a disgust expression generation control. In a specific example, the reference expression model is a smile expression model, the object clicks the angry expression generation control, to display the angry expression model of the game object on the game interface.

In some embodiments, in response to an expression generation operation on a target expression generation control in the expression generation control, a deformed expression model of the game object is displayed, and the deformed expression model corresponds to the target expression generation control.

In some embodiments, this step includes the following sub-steps:
1: Perform model transformation on a sample expression model set by using the reference expression model of the game object as a reference, to obtain a target expression model set.
2: Perform mesh deformation on the reference expression model of the game object according to a mesh deformation difference between a first expression model and a second expression model in the target expression model set, to generate a deformed expression model of the game object.

For details, refer to the following embodiment shown in FIG. 3 to FIG. 8, and details are not described herein again.

To sum up, this embodiment provides a method for generating an expression model of a game object with one click. Only one expression model of a game object is provided to obtain other expression models of the game object. In one aspect, a player can directly obtain a plurality of expression models of a game object, so that the game object is more realistic, enhancing the gaming experience of the player. In another aspect, while providing the player with personalized designs, batch generation of expression models of game objects is implemented.

In an optional implementation of this application, the method for generating an expression model provided in the embodiments of this application can be applied to designing virtual human scenes. For example, the method for generating an expression model is applied to virtual anchors, virtual idols, and the like. The following uses a virtual anchor as an example for description.

Figure 16:
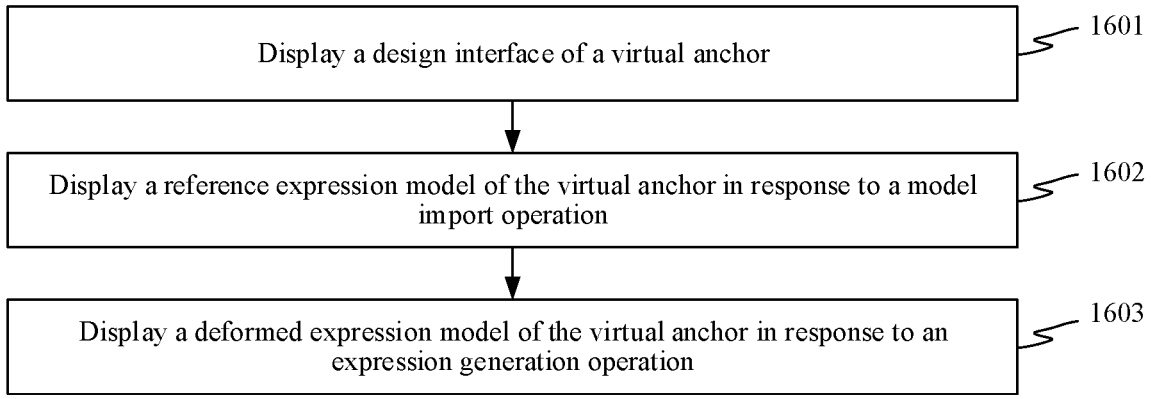
FIG. 16 is a schematic flowchart of a method for generating an expression model according to an exemplary embodiment of this application.

FIG. 16 is a schematic flowchart of a method for generating an expression model according to an exemplary embodiment of this application. The method includes:

Step 1601: Display a design interface of a virtual anchor.

In some embodiments, the design interface includes a model import control, and the model import control is used to import a reference expression model of the virtual anchor.

Step 1602: Display the reference expression model of the virtual anchor in response to a model import operation.

In some embodiments, in response to the model import operation, model parameters of the reference expression model of the virtual anchor are obtained; and the reference expression model of the virtual anchor is displayed according to the model parameters. For example, the model parameters are (w, i, y), where w indicates that corners of a mouth of a first expression model of the virtual anchor are raised, i indicates that eyes of the reference expression model of the virtual anchor are open, and y indicates that hair of the reference expression model of the virtual anchor is black.

In some embodiments, in response to a model editing operation, the first expression model of the virtual anchor is adjusted. For example, the design interface further includes an anchor model editing tab, which is used to adjust model parameters of the reference expression model of the virtual anchor.

Step 1603: Display a deformed expression model of the virtual anchor in response to an expression generation operation.

In some embodiments, an expression generation tab is further displayed on the design interface. The expression generation tab includes expression generation controls corresponding to at least two second expressions. For example, the expression generation control includes but is not limited to at least one of a smile expression generation control, an angry expression generation control, a sad expression generation control, and a disgust expression generation control.

In some embodiments, in response to an expression generation operation on a target expression generation control in the expression generation control, a deformed expression model of the virtual anchor is displayed, and the deformed expression model corresponds to the target expression generation control.

In some embodiments, the expression generation operation displays an expression model set of the virtual anchor. The expression model set of the virtual anchor includes at least two deformed expression models of the virtual anchor.

In an optional implementation, a facial image of the anchor is obtained; a target expression corresponding to the facial image is identified; a target expression model corresponding to the target expression is determined from the expression model set; and the target expression model is rendered to obtain the facial image of the virtual anchor, where the facial image is used in live broadcast of the anchor.

In some embodiments, this step includes the following sub-steps:
1: Perform model transformation on a sample expression model set by using the reference expression model of the virtual anchor as a reference, to obtain a target expression model set.
2: Perform mesh deformation on the reference expression model of the virtual anchor according to a mesh deformation difference between a first expression model and a second expression model in the target expression model set, to generate a deformed expression model of the virtual anchor.

For details, refer to the following embodiment shown in FIG. 3 to FIG. 8, and details are not described herein again.

To sum up, this embodiment provides a method for quickly generating an expression model of a virtual anchor. By using this method, a plurality of expression models can be generated with one click, without manual operation by technicians, thereby improving efficiency. In addition, the generated expression models have a good effect and a high simulation degree.

The following is an apparatus embodiment of this application, which may be used for performing the method embodiments of this application. For details not disclosed in the apparatus embodiment of this application, reference may be made to the method embodiments of this application.

Figure 17:
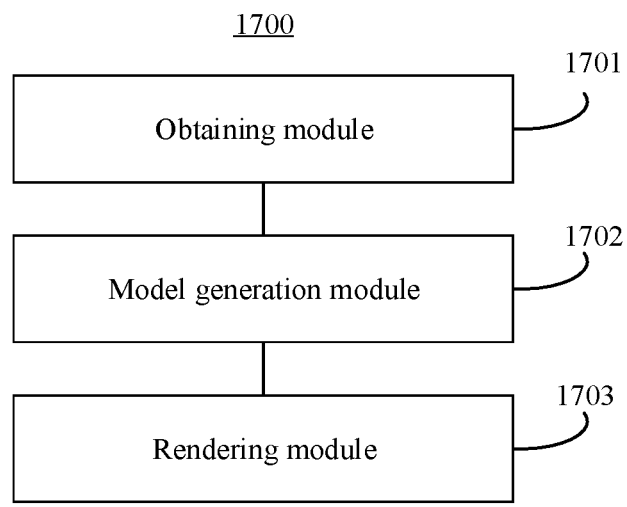
FIG. 17 is a schematic diagram of an apparatus for generating an expression model according to an exemplary embodiment of this application.

FIG. 17 is a block diagram of an apparatus for generating an expression model according to an embodiment of this application. The functions may be implemented by using hardware or may be implemented by using hardware executing corresponding software. The apparatus 1700 includes:
an obtaining module 1701, configured to obtain a reference expression model of a target object, the reference expression model being a facial model corresponding to a first expression; and
a model generation module 1702, configured to perform model transformation on a sample expression model set by using the reference expression model of the target object as a reference, to obtain a target expression model set, the sample expression model set including n sample expression models of a sample object, the target expression model set including n expression models of a approximate object, and the approximate object being obtained by performing facial reconstruction on the sample object by using the target object as a reference.

The model generation module 1702 is further configured to perform mesh deformation on the reference expression model of the target object according to a mesh deformation difference between a first expression model and a second expression model in the target expression model set, to generate a deformed expression model of the target object, the first expression model and the reference expression model being facial models corresponding to a first expression, the second expression model and the deformed expression model being facial models corresponding to a second expression, the second expression being different from the first expression, and n being an integer greater than 1.

In an optional design of this application, the model generation module 1702 is further configured to: determine a model tensor corresponding to the sample expression models in the sample expression model set, where the model tensor includes a core tensor, an identity matrix, and an expression matrix, the core tensor is a sub-tensor of the model tensor, the identity matrix includes an identity vector corresponding to the sample object, and the expression matrix includes n expression vectors; generate a target identity vector of the target object by using the reference expression model as a reference according to the model tensor; generate an $i^{th}$ expression model in the target expression model set according to the core tensor, the target identity vector, and an $i^{th}$ expression vector, where i is a positive integer and starts from 1; and update i to i+1 when i is not equal to n and repeating the process of generating expression models until the target expression model set is obtained.

In an optional design of this application, the model generation module 1702 is further configured to: determine the target object vector corresponding to the target object according to the reference expression model; determine a first expression vector corresponding to the first expression from the expression matrix; and generate the target identity vector based on a product of the core tensor, the target object vector, and the first expression vector.

In an optional design of this application, the model generation module 1702 is further configured to: calculate a vector product of the core tensor and the first expression vector; and generate the target identity vector based on the product of the vector product and the target object vector.

In an optional design of this application, the model generation module 1702 is further configured to: generate the $i^{th}$ expression model in the target expression model set based on a product of the core tensor, the target identity vector, and the $i^{th}$ expression vector.

In an optional design of this application, the model generation module 1702 is further configured to: determine a first deformation matrix of the reference expression model according to the mesh deformation difference between the first expression model and the second expression model in the target expression model set; and perform coordinate transformation on mesh vertexes in the reference expression model according to the first deformation matrix, to generate the deformed expression model of the target object.

In an optional design of this application, the model generation module 1702 is further configured to: determine a second deformation matrix of the first expression model in the target expression model set according to the mesh deformation difference between the first expression model and the second expression model in the target expression model set; generate j candidate deformation matrixes of the reference expression model based on the first expression model in the target expression model set, the reference expression model, and the second deformation matrix when a mesh vertex alignment condition is met, where the mesh vertex alignment condition is used to indicate that common vertexes of a mesh on the first expression model are at same locations before and after the mesh deformation of the first expression model, and j is a positive integer; respectively calculate j differences between the second deformation matrix and the j candidate deformation matrixes; and use a candidate deformation matrix corresponding to a minimum value in the j differences as the first deformation matrix.

In an optional design of this application, the model generation module 1702 is further configured to: obtain a mesh mapping relationship between the first expression model in the target expression model set and the reference expression model; and generate the candidate deformation matrixes according to the second deformation matrix and the mesh mapping relationship when the mesh vertex alignment condition is met.

In an optional design of this application, the model generation module 1702 is further configured to: perform mesh deformation on the first expression model in the target expression model set according to mesh deformation differences between the first expression model in the target expression model set and other expression models in the target expression model set, to generate an expression model set of the target object.

In an optional design of this application, the apparatus further includes: a rendering module 1703.

The rendering module is further configured to arrange expression models in the expression model set to generate an expression model sequence; and render the expression model sequence to obtain a facial video of the target object.

Based on the above, according to this embodiment, after the reference expression model of the target object is obtained, the target expression model set is first generated, where the target expression model set includes expression models of the approximate object. The deformed expression model of the target object is then generated according to the mesh deformation difference between the first expression model and the second expression model in the target model set. Due to the high similarity between the approximate object and the target object, the mesh deformation difference of the expression model of the approximate object can be transferred to the expression model of the target object, so that the expression effect of the deformed expression model of the target object is good and closer to the actual situation.

Figure 18:
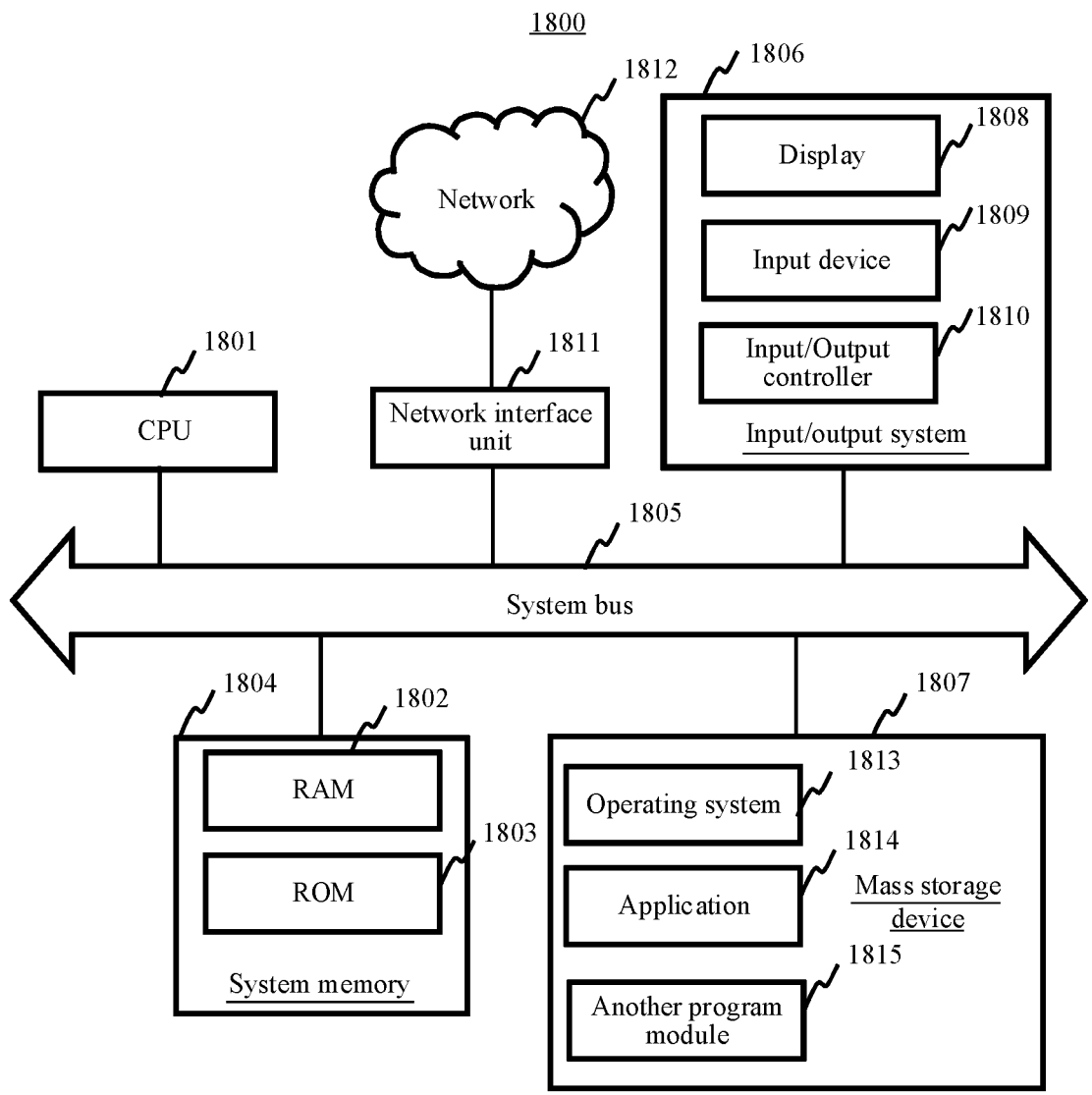
FIG. 18 is a schematic structural diagram of a computer device according to an exemplary embodiment of this application.

FIG. 18 is a schematic structural diagram of a computer device according to an exemplary embodiment. The computer device 1800 includes a CPU 1801, a system memory 1804 including a random access memory (RAM) 1802 and a read-only memory (ROM) 1803, and a system bus 1805 connecting the system memory 1804 to the CPU 1801. The computer device 1800 further includes a basic input/output (I/O) system 1806 assisting in transmitting information between components in the computer device, and a mass storage device 1807 configured to store an operating system 1813, an application 1814, and another program module 1815.

The basic I/O system 1806 includes a display 1808 configured to display information and an input device 1809 such as a mouse or a keyboard that is configured for information inputting by a user. The display 1808 and the input device 1809 are both connected to the CPU 1801 by an input/output controller 1810 connected to the system bus 1805.

The mass storage device 1807 is connected to the CPU 1801 through a mass storage controller (not shown) connected to the system bus 1805. The mass storage device 1807 and an associated computer device-readable medium provide non-volatile storage for the computer device 1800. That is, the mass storage device 1807 may include a computer device-readable medium (not shown) such as a hard disk or a compact disc ROM (CD-ROM) drive.

Without loss of generality, the computer device-readable medium may include a computer device storage medium and a communication medium. The computer device storage medium includes a RAM, a ROM, an erasable programmable read only memory (EPROM), an electrically erasable programmable read only memory (EEPROM), a CD-ROM, a digital video disc (DVD) or another optical memory, a magnetic cassette, a magnetic tape, a magnetic disk memory, or another magnetic storage device. Certainly, a person skilled in the art may learn that the computer device storage medium is not limited to the foregoing several types.

According to the embodiments of the present disclosure, the computer device 1800 may further be connected, through a network such as the Internet, to a remote computer device on the network. That is, the computer device 1800 may be connected to a network 1811 by using a network interface unit 1812 connected to the system bus 1805, or may be connected to another type of network or a remote computer device system (not shown) by using a network interface unit 1812.

The memory further includes one or more programs. The one or more programs are stored in the memory. The CPU 1801 executes the one or more programs to implement all or some steps of the foregoing method for generating an expression model.

In an exemplary embodiment, a computer-readable storage medium is further provided, storing at least one instruction, at least one program, a code set, or an instruction set, the at least one instruction, the at least one program, the code set, or the instruction set being loaded and executed by a processor to implement the method for generating an expression model provided in the foregoing method embodiments.

This application further provides a computer-readable storage medium, storing at least one instruction, at least one program, a code set, or an instruction set, the at least one instruction, the at least one program, the code set, or the instruction set being loaded and executed by a processor to implement the method for generating an expression model provided in the foregoing method embodiments.

This application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the method for generating an expression model described in the foregoing embodiments.

What is claimed is:

1. A method for generating an expression model performed by a computer device, the method comprising:
   obtaining a reference expression model corresponding to a first expression of a target object;
   performing model transformation on a sample expression model set of a sample object by using the reference expression model of the target object as a reference, to obtain a target expression model set of an approximate object of the target object, the target expression model set comprising n expression models of the approximate object; and
   performing mesh deformation on the reference expression model of the target object according to a mesh deformation difference between a first expression model corresponding to the first expression and a second expression model corresponding to a second expression in the target expression model set, to generate a deformed expression model corresponding to the second expression of the target object.

2. The method according to claim 1, wherein the approximate object is obtained by performing facial reconstruction on the sample object by using the target object as a reference.

3. The method according to claim 1, wherein the second expression is different from the first expression.

4. The method according to claim 1, wherein the performing model transformation on a sample expression model set of a sample object by using the reference expression model of the target object as a reference, to obtain a target expression model set of an approximate object of the target object comprises:
   determining a model tensor corresponding to the sample expression model set, wherein the model tensor comprises a core tensor, an identity matrix, and an expression matrix, the core tensor is a sub-tensor of the model tensor, the identity matrix comprises an identity vector corresponding to the sample object, and the expression matrix comprises n expression vectors;

generating a target identity vector of the target object by using the reference expression model as a reference according to the model tensor;

generating an ith expression model in the target expression model set according to the core tensor, the target identity vector, and an ith expression vector, wherein i is a positive integer and starts from 1; and repeating the process of generating expression models until the target expression model set is obtained.

5. The method according to claim 4, wherein the generating a target identity vector of the target object by using the reference expression model as a reference according to the model tensor comprises:

determining the target object vector corresponding to the target object according to the reference expression model;

determining a first expression vector corresponding to the first expression from the expression matrix; and generating the target identity vector based on a product of the core tensor, the target object vector, and the first expression vector.

6. The method according to claim 3, wherein the generating an ith expression model in the target expression model set according to the core tensor, the target identity vector, and an ith expression vector comprises:

generating the ith expression model in the target expression model set based on a product of the core tensor, the target identity vector, and the ith expression vector.

7. The method according to claim 1, wherein the performing mesh deformation on the reference expression model of the target object according to a mesh deformation difference between a first expression model corresponding to the first expression and a second expression model corresponding to a second expression in the target expression model set, to generate a deformed expression model corresponding to the second expression of the target object comprises:

determining a first deformation matrix of the reference expression model according to the mesh deformation difference between the first expression model and the second expression model in the target expression model set; and performing coordinate transformation on mesh vertexes in the reference expression model according to the first deformation matrix, to generate the deformed expression model of the target object.

8. The method according to claim 7, wherein the determining a first deformation matrix of the reference expression model according to the mesh deformation difference between the first expression model and the second expression model in the target expression model set comprises:

determining a second deformation matrix of the first expression model in the target expression model set according to the mesh deformation difference between the first expression model and the second expression model in the target expression model set;

generating j candidate deformation matrixes of the reference expression model based on the first expression model in the target expression model set, the reference expression model, and the second deformation matrix when a mesh vertex alignment condition is met, wherein the mesh vertex alignment condition is used to indicate that common vertexes of a mesh on the first expression model are at same locations before and after the mesh deformation of the first expression model, and j is a positive integer;

respectively calculating j differences between the second deformation matrix and the j candidate deformation matrixes; and using a candidate deformation matrix corresponding to a minimum value in the j differences as the first deformation matrix.

9. The method according to claim 1, further comprising:

performing mesh deformation on the first expression model in the target expression model set according to mesh deformation differences between the first expression model in the target expression model set and other expression models in the target expression model set, to generate an expression model set of the target object.

10. The method according to claim 9, further comprising:

arranging expression models in the expression model set to generate an expression model sequence; and rendering the expression model sequence to obtain a facial video of the target object.

11. A computer device, comprising a processor and a memory, the memory storing at least one instruction that, when executed by the processor, causes the computer device to implement a method for generating an expression model including:

obtaining a reference expression model corresponding to a first expression of a target object;

performing model transformation on a sample expression model set of a sample object by using the reference expression model of the target object as a reference, to obtain a target expression model set of an approximate object of the target object, the target expression model set comprising n expression models of the approximate object; and performing mesh deformation on the reference expression model of the target object according to a mesh deformation difference between a first expression model corresponding to the first expression and a second expression model corresponding to a second expression in the target expression model set, to generate a deformed expression model corresponding to the second expression of the target object.

12. The computer device according to claim 11, wherein the approximate object is obtained by performing facial reconstruction on the sample object by using the target object as a reference.

13. The computer device according to claim 11, wherein the second expression is different from the first expression.

14. The computer device according to claim 11, wherein the performing model transformation on a sample expression model set of a sample object by using the reference expression model of the target object as a reference, to obtain a target expression model set of an approximate object of the target object comprises:

determining a model tensor corresponding to the sample expression model set, wherein the model tensor comprises a core tensor, an identity matrix, and an expression matrix, the core tensor is a sub-tensor of the model tensor, the identity matrix comprises an identity vector corresponding to the sample object, and the expression matrix comprises n expression vectors;

generating a target identity vector of the target object by using the reference expression model as a reference according to the model tensor;

generating an ith expression model in the target expression model set according to the core tensor, the target identity vector, and an ith expression vector, wherein i is a positive integer and starts from 1; and
repeating the process of generating expression models until the target expression model set is obtained.

15. The computer device according to claim 13, wherein the generating an ith expression model in the target expression model set according to the core tensor, the target identity vector, and an ith expression vector comprises:
generating the ith expression model in the target expression model set based on a product of the core tensor, the target identity vector, and the ith expression vector.

16. The computer device according to claim 11, wherein the performing mesh deformation on the reference expression model of the target object according to a mesh deformation difference between a first expression model corresponding to the first expression and a second expression model corresponding to a second expression in the target expression model set, to generate a deformed expression model corresponding to the second expression of the target object comprises:
determining a first deformation matrix of the reference expression model according to the mesh deformation difference between the first expression model and the second expression model in the target expression model set; and
performing coordinate transformation on mesh vertexes in the reference expression model according to the first deformation matrix, to generate the deformed expression model of the target object.

17. The computer device according to claim 16, wherein the determining a first deformation matrix of the reference expression model according to the mesh deformation difference between the first expression model and the second expression model in the target expression model set comprises:
determining a second deformation matrix of the first expression model in the target expression model set according to the mesh deformation difference between the first expression model and the second expression model in the target expression model set;
generating j candidate deformation matrixes of the reference expression model based on the first expression model in the target expression model set, the reference expression model, and the second deformation matrix when a mesh vertex alignment condition is met, wherein the mesh vertex alignment condition is used to indicate that common vertexes of a mesh on the first expression model are at same locations before and after the mesh deformation of the first expression model, and j is a positive integer;
respectively calculating j differences between the second deformation matrix and the j candidate deformation matrixes; and
using a candidate deformation matrix corresponding to a minimum value in the j differences as the first deformation matrix.

18. The computer device according to claim 11, wherein the method further comprises:
performing mesh deformation on the first expression model in the target expression model set according to mesh deformation differences between the first expression model in the target expression model set and other expression models in the target expression model set, to generate an expression model set of the target object.

19. The computer device according to claim 18, wherein the method further comprises:
arranging expression models in the expression model set to generate an expression model sequence; and
rendering the expression model sequence to obtain a facial video of the target object.

20. A non-transitory computer-readable storage medium, storing at least one program code that, when executed by a processor of a computer device, causes the computer device to implement a method for generating an expression model including:
obtaining a reference expression model corresponding to a first expression of a target object;
performing model transformation on a sample expression model set of a sample object by using the reference expression model of the target object as a reference, to obtain a target expression model set of an approximate object of the target object, the target expression model set comprising n expression models of the approximate object; and
performing mesh deformation on the reference expression model of the target object according to a mesh deformation difference between a first expression model corresponding to the first expression and a second expression model corresponding to a second expression in the target expression model set, to generate a deformed expression model corresponding to the second expression of the target object.

* * * * *